(12) United States Patent
Rodenbeck et al.

(10) Patent No.: US 9,720,080 B1
(45) Date of Patent: Aug. 1, 2017

(54) COMBINED RADAR AND TELEMETRY SYSTEM

(71) Applicant: Sandia Corporation, Albuquerque, NM (US)

(72) Inventors: Christopher T. Rodenbeck, Albuquerque, NM (US); Derek Young, Fremont, CA (US); Tina Chou, Livermore, CA (US); Lung-Hwa Hsieh, Albuquerque, NM (US); Kurt Conover, Albuquerque, NM (US); Richard Heintzleman, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 24 days.

(21) Appl. No.: 14/552,738

(22) Filed: Nov. 25, 2014

(51) Int. Cl.
*G01S 13/86* (2006.01)
*G01S 7/36* (2006.01)
(Continued)

(52) U.S. Cl.
CPC .............. *G01S 13/86* (2013.01); *G01C 21/36* (2013.01); *G01S 7/36* (2013.01); *G01S 13/04* (2013.01); *G01S 13/58* (2013.01); *H04K 3/20* (2013.01)

(58) Field of Classification Search
CPC ........ G01C 21/26; G01C 21/34; G01C 21/36; G01S 13/02; G01S 13/04; G01S 13/50; G01S 13/58; G01S 13/86; G01S 1/02; G01S 13/74; G01S 13/75; G01S 13/751; G01S 13/756; G01S 13/758; G01S 13/76; G01S 13/765; G01S 13/767; G01S 13/78; G01S 13/781; G01S 13/784; G01S 13/82; G01S 13/825; G01S 7/02; G01S 7/35; G01S 7/352; G01S 7/354; G01S 7/36;
(Continued)

(56) References Cited

U.S. PATENT DOCUMENTS 3,179,355 A * 4/1965 Pickering .................. F41G 7/30
244/190
3,550,124 A 12/1970 Heft et al.
(Continued)

FOREIGN PATENT DOCUMENTS

EP 0013195 B1 12/1982

OTHER PUBLICATIONS

Bocquet, et al., "A Multifunctional 60-GHz System for Automotive Applications with Communication and Positioning Abilities Based on Time Reversal," In Proceedings of the 7th European Radar Conference, Sep. 30, 2010, pp. 61-64.
(Continued)

*Primary Examiner* — Bernarr Gregory
(74) *Attorney, Agent, or Firm* — Medley, Behrens & Lewis, LLC

(57) ABSTRACT

A combined radar and telemetry system is described. The combined radar and telemetry system includes a processing unit that executes instructions, where the instructions define a radar waveform and a telemetry waveform. The processor outputs a digital baseband signal based upon the instructions, where the digital baseband signal is based upon the radar waveform and the telemetry waveform. A radar and telemetry circuit transmits, simultaneously, a radar signal and telemetry signal based upon the digital baseband signal.

20 Claims, 30 Drawing Sheets

(51) Int. Cl.
*G01S 13/58* (2006.01)
*G01S 13/04* (2006.01)
*G01C 21/36* (2006.01)
*H04K 3/00* (2006.01)
*G01S 13/00* (2006.01)
*G01S 7/00* (2006.01)

(58) Field of Classification Search
CPC ....... H04M 11/002; G01K 1/02; G01K 1/024; G08C 17/02; G01D 4/002; G01D 4/004; G01D 4/006; G06K 7/0008; G06K 19/06; G06K 19/067; G06K 19/07; G06K 19/0723; G06F 1/02; G06F 1/022; G06F 1/025; G06F 1/03; G06F 1/0314; G06F 1/0321; G06F 1/0328; F41G 7/20; F41G 7/30; H04K 3/20
USPC ... 342/13–20, 42–51, 52, 57, 58, 60, 82, 89, 342/175, 195, 159–164; 379/90.01, 379/106.01, 106.03, 106.07; 340/1.1, 340/10.1, 10.4, 10.41, 500, 540, 679, 682
See application file for complete search history.

(56) References Cited

U.S. PATENT DOCUMENTS

| | | | | |
|---|---|---|---|---|
| 3,705,385 A * | 12/1972 | Batz | ............... | G01D 4/006 342/50 |
| 3,713,148 A * | 1/1973 | Cardullo | ............... | G01S 13/765 342/42 |
| 3,754,250 A * | 8/1973 | Bruner | ............... | G01D 4/006 342/50 |
| 3,801,979 A * | 4/1974 | Chisholm | ............... | G01S 13/86 342/49 |
| 3,822,380 A * | 7/1974 | Forgione | ............... | G06F 1/0328 327/106 |
| 3,842,206 A * | 10/1974 | Barsellotti | ............... | H04M 11/002 379/106.07 |
| 3,864,662 A * | 2/1975 | David | ............... | G01S 1/02 342/46 |
| 3,967,202 A * | 6/1976 | Batz | ............... | G01S 13/78 342/42 |
| 3,984,835 A * | 10/1976 | Kaplan | ............... | G01S 13/825 342/44 |
| 4,067,011 A * | 1/1978 | Althaus | ............... | G01S 13/784 342/51 |
| 4,068,232 A * | 1/1978 | Meyers | ............... | G01S 13/758 342/51 |
| 4,075,632 A * | 2/1978 | Baldwin | ............... | G01S 13/825 342/50 |
| 4,114,151 A * | 9/1978 | Denne | ............... | G01S 13/758 342/44 |
| 5,053,774 A * | 10/1991 | Schuermann | ............... | G01S 13/758 342/51 |
| 5,194,869 A * | 3/1993 | Kochiyama | ............... | G08C 17/02 342/50 |
| 5,204,684 A | 4/1993 | Caudroy | | |
| 5,245,346 A * | 9/1993 | Nishimura | ............... | G01S 13/825 342/42 |
| 5,355,521 A * | 10/1994 | Henoch | ............... | G01S 13/825 342/51 |
| 5,446,452 A * | 8/1995 | Litton | ............... | G01K 1/024 340/682 |
| 5,451,959 A * | 9/1995 | Schuermann | ............... | G01S 13/78 342/44 |
| 5,712,628 A * | 1/1998 | Phillips | ............... | G01S 13/74 342/51 |
| 5,745,049 A * | 4/1998 | Akiyama | ............... | G06K 7/0008 342/51 |
| 5,825,302 A * | 10/1998 | Stafford | ............... | G06K 7/0008 340/10.41 |
| 6,246,356 B1 * | 6/2001 | Gunnarsson | ............... | G01S 13/756 342/42 |
| 7,109,844 B2 * | 9/2006 | Taki | ............... | G06K 19/0723 340/10.1 |

OTHER PUBLICATIONS

Konno, et al., "Millimeter-Wave Dual Mode Radar for Headway Control in IVHS," In IEEE MTT-S International, vol. 3, 1997, pp. 1261-1264.
Stelzer, et al., "Precise Distance Measurement with Cooperative FMCW Radar Units," In IEEE, 2008, pp. 771-774.
Winkler, et al., "Automotive 24 GHz Pulse Radar Extended by a DQPSK Communication Channel," In Proceedings of the 4th European Radar Conference, Oct. 2007, pp. 138-141.
Saddik, et al., "Ultra-Wideband Multifunctional Communications/Radar System," In IEEE Transactions on Microwave Theory and Techniques, vol. 55, Issue 7, Jul. 2007, pp. 1431-1437.
Han, et al., "24-GHz Integrated Radio and Radar System Capable of Time-Agile Wireless Communication and Sensing," In IEEE Transactions on Microwave Theory and Techniques, vol. 60, Issue 3, Mar. 2012, pp. 619-631.
Han, et al., "Multifunctional Transceiver for Future Intelligent Transportation Systems," In IEEE Transactions on Microwave Theory and Techniques, vol. 59, Issue 7, Jul. 2011, pp. 1879-1892.
Han, et al., "24-GHz Joint Radar and Radio System Capable of Time-Agile Wireless Sensing and Communication," Microwave Symposium Digest (MTT), 2011, 4 pages.
Surender, et al., "Performance Analysis of Communications & Radar Coexistence in a Covert UWB OSA System," GLOBECOM 2010, Dec. 6, 2010, 5 pages.
Garmatyuk, et al., "Multifunctional Software-Defined Radar Sensor and Data Communication System," In IEEE Sensors Journal, vol. 11, Issue 1, Jan. 2011, pp. 99-106.
Saddick, et al., "Ultra-Wideband, Multifunctional Communications/RADAR System," Retrieval Date: Apr. 4, 2012, 1 page.

* cited by examiner

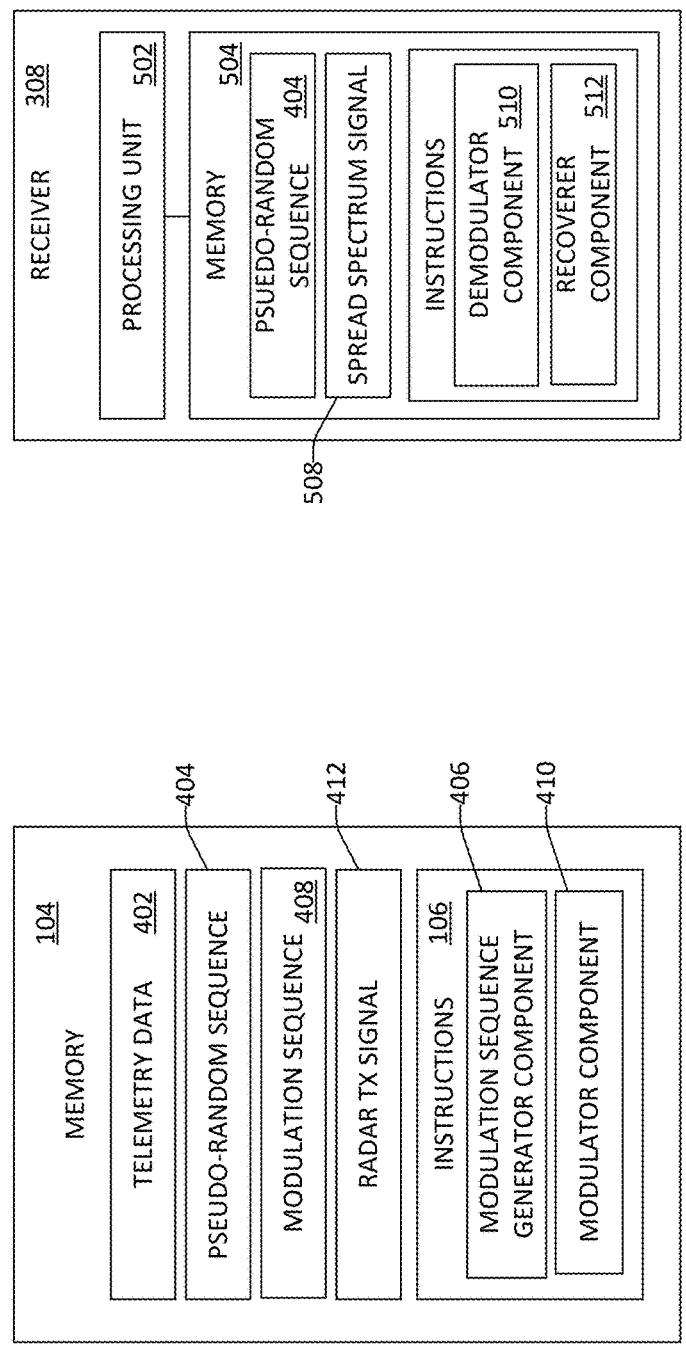

COMBINED RADAR AND TELEMETRY SYSTEM

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

There are a variety of applications for radar systems, including use in connection with automated navigation (e.g., guiding of an airborne object, guiding of vehicle, etc.). Generally, a radar system includes a transmitter and a receiver, where the transmitter is configured to emit a radar signal and the receiver is configured to receive at least a portion of the radar signal responsive to the radar signal reflecting from a target. Based upon time of flight of the radar signal, the radar system can identify a distance between the radar system and the target (as well as a rate of change of the distance between the radar system and the target). Additionally, radar systems can be used to track objects, identify objects, search for movement or a particular object, etc.

Telemetry transmitters are configured to emit signals that include data that is desirably transmitted to a recipient station. Data transmitted by a telemetry transmitter can include any suitable data pertaining to the apparatus that includes the telemetry transmitter. In an example, when the telemetry transmitter is included in a truck carrying hazardous material, it may be desirable for the telemetry transmitter to emit data that is indicative of velocity of the truck, weight of the truck, etc. (e.g., for safety purposes).

Conventionally, radar and telemetry transmitters have been implemented separately. This is at least partially due to strict standards set forth for many telemetry applications, which can specify a data rate at which the telemetry transmitter can transmit data, a frequency over the data is to be transmitted, a format of the data, etc.

SUMMARY

The following is a brief summary of subject matter that is described in greater detail herein. This summary is not intended to be limiting as to the scope of the claims.

Described herein are various technologies pertaining to radar systems and/or telemetry systems. In an exemplary embodiment, a combined radar and telemetry transmission system is described herein. In such a system, a radar signal and a telemetry signal can be transmitted simultaneously from an antenna. Further, telemetry and radar waveforms can be defined in computer-executable instructions (software), thereby providing flexibility for potentially changing telemetry standards. In an exemplary embodiment, the combined radar and telemetry system includes a processing unit and a memory, wherein the memory includes instructions that can be executed by the processing unit. The instructions cause the processing unit to output a (digital) baseband signal that includes a telemetry waveform and a radar waveform. A radar and telemetry transmission circuit receives the signal, converts the baseband signal to an analog signal, and emits a combined radar and telemetry signal from an antenna based upon the analog signal. The instructions can be modified by an operator of the combined radar and telemetry system, such that arbitrary radar and telemetry waveforms can be defined.

In another exemplary embodiment, telemetry data can be encoded in a radar signal emitted from a spread spectrum radar transmitter. More particularly, a radar waveform can be modulated by a modulation sequence, where the modulation sequence is a function of telemetry data. When a telemetry receiver acquires the radar signal, the telemetry receiver can de-ramp the radar signal, thereby allowing for acquisition of the telemetry data.

With more particularity, the computer-executable instructions referenced above can define a radar waveform and a pseudo-random modulation sequence that can be employed to modulate the radar waveform. This pseudo-random sequence can be multiplied by the telemetry data that is to be encoded in the emitted radar signal, thereby generating a modulation sequence. The radar waveform can then be modulated by the modulation sequence. The telemetry receiver can have knowledge of the pseudo-random sequence, and can de-ramp the radar waveform to extract the telemetry data from the radar signal.

In yet another exemplary embodiment, a radar system can be configured to cancel multiple leakage paths (simultaneously) between a radar transmitter and radar receiver. The processing unit referenced above can execute instructions that are configured to generate cancellation signals for known leakage paths between the radar transmitter and the radar receiver. The processor can output the cancellation signals to a digital-to-analog converter (DAC), which generates an analog cancellation signal (which is based upon the cancellation signals for each of the known leakage paths). An analog to digital converter (ADC) receives an analog return signal (e.g., based upon a reflected radar signal), and is coupled to the DAC. The DAC outputs the analog cancellation signal to the ADC, where it is combined with the analog return signal (and any signals from the leakage paths). The analog cancellation signal cancels the signals from the leakage paths, and the ADC outputs a "clean" digital return signal to the processing unit for processing.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 is a functional block diagram that illustrates exemplary content of computer-readable memory in a combined radar and telemetry system.

FIG. 5 is a functional block diagram of an exemplary telemetry receiver.

DETAILED DESCRIPTION

Figure 1:
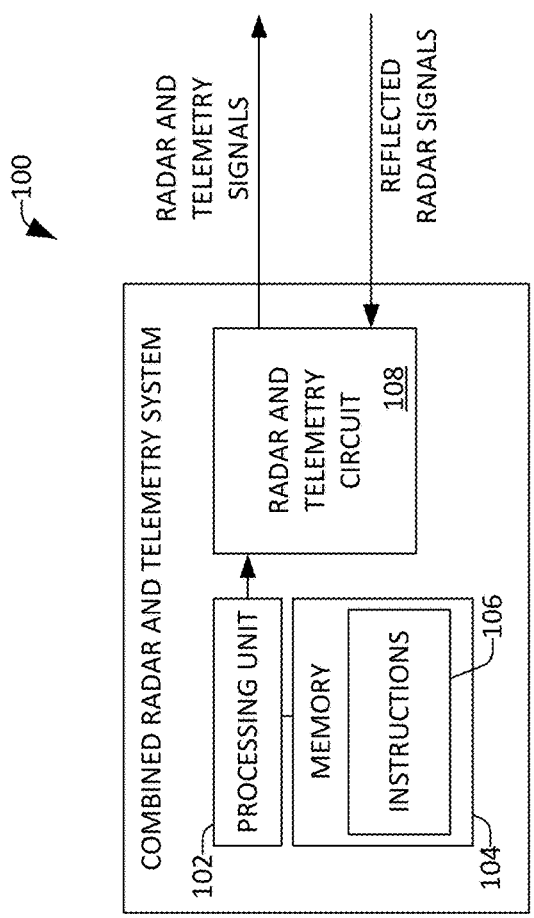
FIGS. 1 and 2 are functional block diagrams of an exemplary combined radar and telemetry system.

Various technologies pertaining to radar systems and/or telemetry systems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, a functional block diagram of a combined radar and telemetry system 100 is illustrated. The combined radar and telemetry system 100 includes a (programmable) processing unit 102 and a memory 104, wherein the memory 104 includes instructions 106 that are executed by the processing unit 102. In an example, the processing unit 102 and the memory 104 may be included in a field programmable gate array (FPGA). In another example, the processing unit 102 and/or the memory 104 may be included in an application-specific integrated circuit (ASIC). In yet another example, the processing unit 102 may be a central processing unit (CPU). The combined radar and telemetry system 100 also includes a radar and telemetry circuit 108 that is in communication with the processing unit 102. As will be described in greater detail herein, the radar and telemetry circuit 108 includes an antenna and other circuit elements that are configured to cause signals to be emitted by way of the antenna. More specifically, the radar and telemetry circuit 108 is configured to simultaneously emit radar and telemetry signals based upon output of the processing unit 102.

With more detail, the instructions 106 in the memory 104 can include instructions that, when executed by the processing unit 102, cause the processing unit 102 to generate an (arbitrary) baseband signal. With still more particularity, the instructions 106, when executed by the processing unit 102, can cause the processing unit 102 to generate a telemetry waveform and a radar waveform, wherein the baseband signal is based upon the telemetry waveform and the radar waveform. The telemetry waveform includes telemetry data that is to be emitted from the radar and telemetry circuit 108. Accordingly, the instructions 106, which can be altered as desired, can define both the telemetry waveform and the radar waveform. In a non-limiting example, the telemetry waveform, the radar waveform, and/or the synthesis of the waveforms can be distorted prior to being delivered to an output amplifier.

In operation, the processing unit 102 executes the instructions 106 in the memory, and emits the (digital) baseband signal based upon the radar and telemetry waveforms defined in the instructions 106. It is to be understood that the telemetry waveform can be dynamic in nature, and can be a function of signals received a sensor (for example). Thus, the instructions 106 may include telemetry data in a memory buffer, wherein the telemetry data is received from one or more sensors or other devices. The radar and telemetry circuit 108 receives the baseband signal. As will be described in greater detail below, the radar and telemetry circuit 108 includes circuit componentry that is configured to convert the digital baseband signal to an analog baseband signal, upconvert the analog baseband signal to form radar and telemetry signals, and transmit the radar and telemetry signals from the antenna. The antenna thus simultaneously transmits the radar signal and the telemetry signal that is defined in the computer-executable instructions 106. In an example, the radar signal and telemetry signals may be in different frequency bands. For example, the radar signal may have a first center frequency, while the telemetry signal may have a second center frequency. In a non-limiting example, the first center frequency may be approximately 1600 MHz, while the second center frequency may be approximately 2.25 GHz.

The combined radar and telemetry system 100 may optionally be configured to receive and process radar signals. For example, the radar and telemetry circuit 108 can include a radar receiver, which includes an antenna that is configured to receive reflected radar signals (e.g., radar emitted by the combined radar and telemetry system 100 that have reflected from a target). The radar and telemetry circuit 108 can be configured to, for example, digitize the received radar signal and provide the digitized signal to the processing unit 102 (or another processing unit). The processing unit 102 can then output data that is indicative of a distance between the combined radar and telemetry system 100 and the target from which the radar signal reflected.

The processing unit 102, in an example, may also be configured with navigation instructions that can control navigation of a vehicle (that includes the combined radar and telemetry system 100) based upon the received radar signals. In non-limiting examples, a vehicle (such as a truck) may include the combined radar and telemetry system 100. In another example, an airplane may include the combined radar and telemetry system 100. In still yet another example, a drone may include the combined radar and telemetry system 100. In still yet another example, an airborne projectile may include the combined radar and telemetry system 100.

Figure 2:
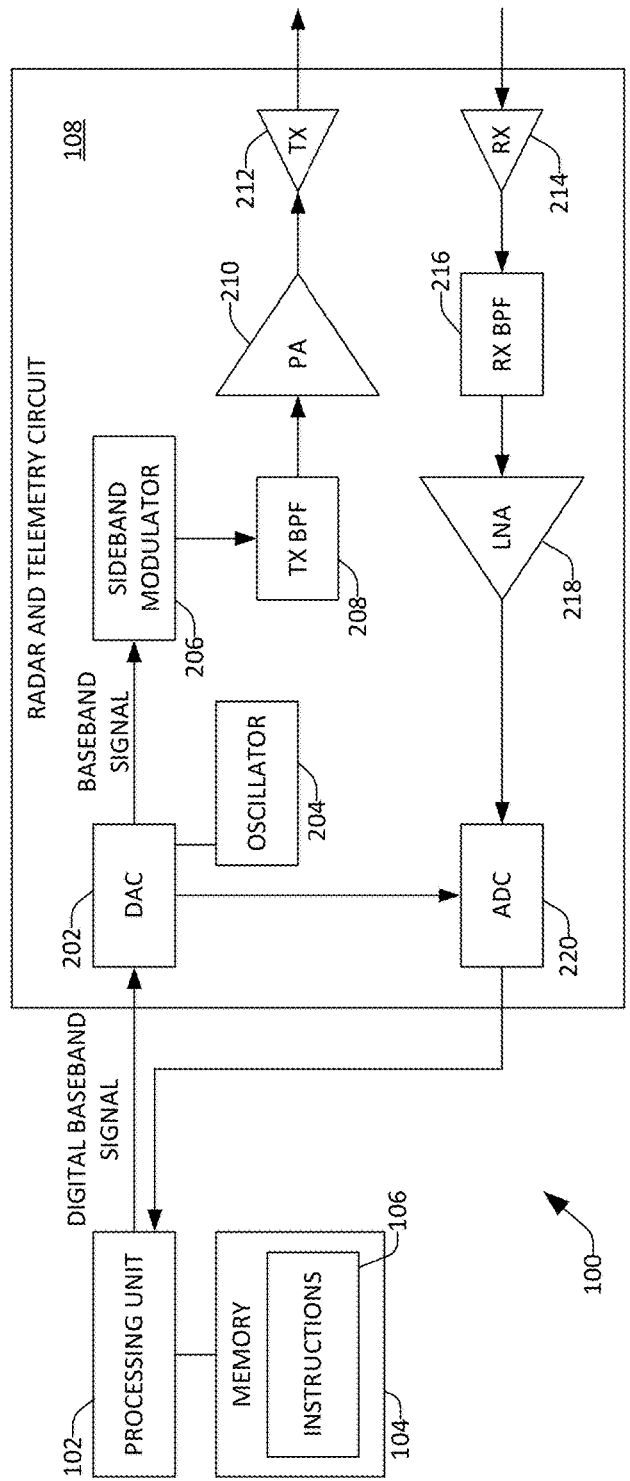

Turning now to FIG. 2, another exemplary functional block diagram of the combined radar and telemetry system 100 is illustrated. As described above, the combined radar and telemetry system 100 includes the processing unit 102 and the memory 104, wherein the instructions 106 in the memory 104 are executed by the processing unit 102. The processing unit 102 is in communication with the radar and telemetry circuit 108. The radar and telemetry circuit 108 includes a digital-to-analog converter (DAC) 202. The DAC 202 can be a relatively high speed DAC that can be configured to receive and process data at a rate of at least, for example, 1600 megasamples (MS) per second, with 14 bit resolution.

The radar and telemetry circuit 108 also includes an oscillator 204 that is in communication with the DAC 202, wherein the oscillator 204 is configured to output clock signals to the DAC 202. A sideband modulator 206 is optionally operably coupled to the DAC 202 and is configured to receive signals output by the DAC 202 and amplitude modulate such signals.

The radar and telemetry circuit 108 further includes a bandpass filter (BPF) 208 that receives signals output by the sideband modulator 206 and filter frequencies in the signals outside of a defined passband. A power amplifier (PA) 210 is coupled to the BPF 208 and amplifies signals output by the BPF 208. A transmit antenna 212 receives signals output by the PA 210 and transmits the signals over the air (OTA). The DAC 202, the oscillator 204, the sideband modulator 206, the BPF 208, the PA 210, and the transmit antenna 212 are analog componentry of the transmitter of the combined radar and telemetry system 100.

The radar and telemetry circuit 108 also optionally includes a radar receiver. The radar receiver comprises a receive antenna 214 that is configured to receive radar signals reflected from a target. The radar and telemetry circuit 108 also includes a second BPF 216 that receives signals from the receive antenna 214, and filters frequencies outside of a pre-defined passband. A low noise amplifier (LNA) 218 is operably coupled to the BPF 216, and is configured to amplify signals output by the BPF 216.

The radar and telemetry circuit 108 also includes an analog-to-digital converter (ADC) 220 that is operably coupled to the LNA 218, and is further optionally coupled to the DAC 202 and/or the oscillator 204 (to synchronize the ADC 220 with the DAC 202). The ADC 220 is configured to receive signals output by the LNA 218 and convert the signals to digital signals. In an example, the ADC 220 can be a relatively high speed ADC. For instance, the ADC 220 can be configured to have an analog bandwidth of approximately 2.1 GHz with 12 bit resolution at its output. Further, the ADC 220 can be configured to output one gigasample (GS) per second (or more). The ADC 220 is operably coupled to the processing unit 102 (or another processing unit). Accordingly, for instance, the processing unit 102 is configured to receive digital signals output by the ADC 220, and is further configured to process the digital signal to compute distances between the combined radar and telemetry system 100 and targets that reflect radar signals emitted from the combined radar and telemetry system 100.

Operation of the combined radar and telemetry system 100 is now set forth. As indicated previously, the instructions 106 define both radar and telemetry waveforms. The processing unit 102 executes the instructions 106 to generate a digital baseband signal, which is effectively a synchronization of the radar and telemetry waveforms. This digital baseband signal is transmitted to the radar and telemetry circuit 108.

The DAC 202 receives the digital baseband signal and converts the digital baseband signal to an analog baseband signal. The oscillator 204 outputs clock signals that can be used to synchronize the DAC 202 with the ADC 220. The sideband modulator 206 receives the analog baseband signal and amplitude modulates the analog baseband signal to generate a modulated signal. The BPF 208 receives the modulated signal and filters the modulated signal to remove unwanted frequencies therefrom, thereby outputting a filtered signal. The PA 210 receives the filtered signal and amplifies the filtered signal to generate an amplified signal. The transmit antenna 212 receives the filtered signal from the PA 210, and transmits, simultaneously, a radar and telemetry signal based upon the amplified signal. The waveforms of the radar and telemetry signal, as mentioned above, are defined in the instructions 106.

The radar signal transmitted from the transmit antenna 212 can reflect from an object and be directed back towards the radar and telemetry circuit 108. The receive antenna 214 can receive the reflected radar signal, and the bandpass filter 216 can filter unwanted frequencies therefrom, thereby outputting a filtered signal. The low noise amplifier 218 receives the filtered signal from the BPF 216, and amplifies the filtered signal to generate an amplified signal. The ADC 220 receives the amplified signal, and converts the amplified signal to a digital signal. The processing unit 102 receives the digital signal from the ADC 220, and outputs data that is indicative of a distance between the combined radar and telemetry system 100 and the target based upon the digital signal.

Figure 3:
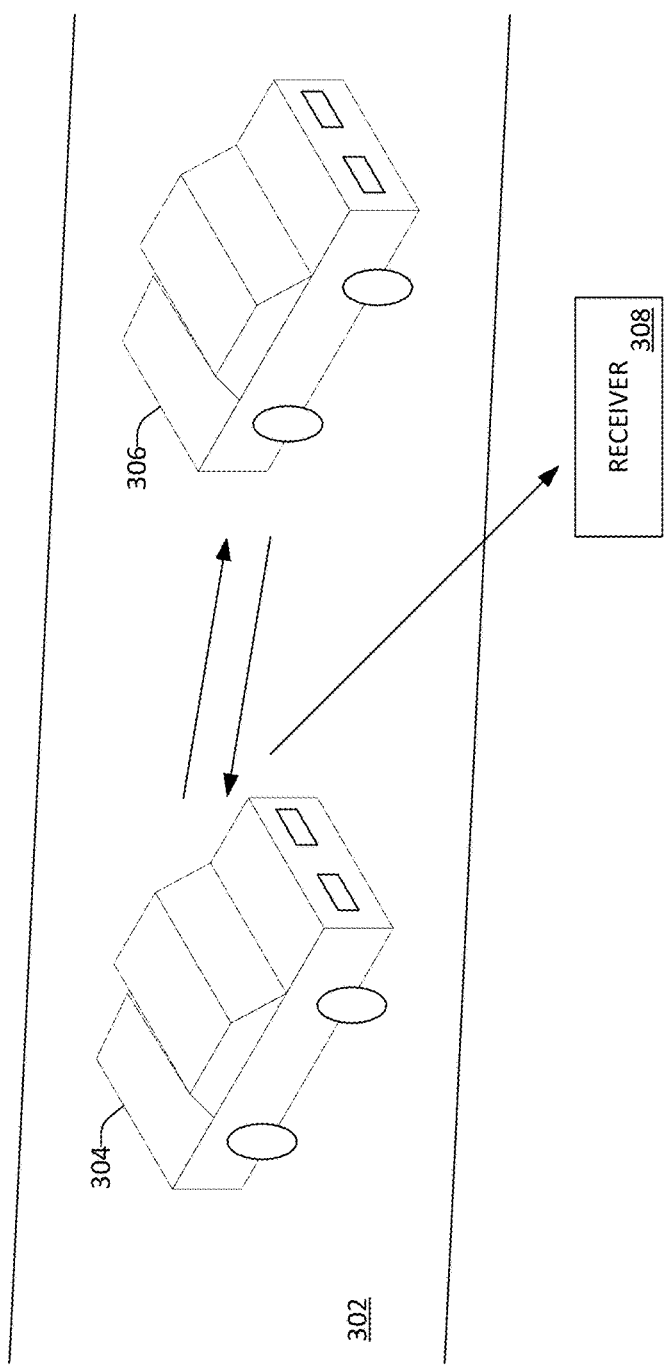
FIG. 3 is a diagram of an environment where the exemplary combined radar and telemetry system is well-suited for use.

Turning now to FIG. 3, an exemplary environment 300 where aspects described herein may be particularly well-suited is illustrated. The environment 300 includes a roadway 302 upon which a first vehicle 304 and a second vehicle 306 are traveling. In an example, the first vehicle 304 can include the combined radar and telemetry system 100. As the first vehicle 304 travels along the roadway 302, the combined radar and telemetry system 100 simultaneously emits radar and telemetry signals. As can be ascertained, for example, a radar signal 308 can travel towards the second vehicle 306, be reflected from the second vehicle 306, and return to the first vehicle 304. The combined radar and telemetry system 100 in the first vehicle 304 can process the reflected radar signal, and can determine a distance between the first vehicle 304 and the second vehicle 306. Over time, then, the combined radar and telemetry system 100 can compute a rate of change of the distance between the vehicles 304 and 306. This information may be used, for example, to automatically navigate the first vehicle 304 along the roadway 302. That is, the combined radar and telemetry system 100 can be used when the first vehicle 304 is a self-guided vehicle, when the first vehicle 304 is configured with automated parking functionality, etc. In an example, when included in the first vehicle 304, the combined radar and telemetry system 100 can be configured to output radar signals at between approximately 24 GHz and 77 GHz.

The combined radar and telemetry system 100 in the first vehicle 304 also outputs a telemetry signal. A ground station (shown as a receiver 308) can receive the telemetry signal output by the first vehicle 304. The telemetry data may be any suitable data pertaining to operation of the first vehicle, including but not limited to velocity of the first vehicle 304, weight of the first vehicle 304, amount of time since the first vehicle 304 has stopped, amount of fuel remaining in a fuel tank of the first vehicle 304, or any other suitable data that may be acquired from a sensor pertaining to the first vehicle 304.

Now referring to FIG. 4, a block diagram illustrating an exemplary configuration of the memory 104 and the instructions 106 is depicted. In contrast to examples set forth above, the instructions 106, in the configuration shown here, can be configured to encode telemetry data in a radar signal (e.g., a spread spectrum radar signal). In the exemplary configuration, the memory 104 includes telemetry data 402 that is to be output by a combined radar and telemetry system. The memory 104 also includes a pseudo-random sequence 404, which can be used to modulate a radar transmit signal. The pseudo-random sequence 404 may be pseudo-noise or a cyclo-stationary sequence. For example, the pseudo-random sequence 404 can be generated by a random number generator, can be a predetermined sequence of a desired length, a sequence generated by an analog system, etc.

The instructions 106 include a modulation sequence generator component 406 that is configured to generate a modulation sequence 408 based upon the telemetry data 402 and the pseudo-random sequence 404. In an example, the modulation sequence generator component 406 can multiply the pseudo-random sequence 404 with the telemetry data 402 to produce the modulation sequence 408. It is to be understood, however, that the modulation sequence generator component 406 can utilize any suitable scheme for generating the modulation sequence 408 based upon the telemetry data 402 and the pseudo-random sequence 404.

The instructions 106 further include a modulator component 410 that modulates a radar transmit signal 412 by the modulation sequence 408 generated by the modulation sequence generator component 406. This results in output of a spread spectrum radar signal. The spread spectrum radar signal may then be provided to a radar transmit circuit (not shown), which is configured to cause the spread spectrum radar signal to be transmitted from a transmit antenna.

With reference now to FIG. 5, an exemplary depiction of the receiver 308 is illustrated. In this example, the receiver 308 includes a processing unit 502 and a memory 504, wherein the memory 504 includes instructions 506 that are executed by the processing unit 502. The memory 504 includes the pseudo-random sequence 404 upon which the modulation sequence 408 used by the modulator component 410 to modulate the radar transmit signal is based. Accordingly, the receiver 308 can have a priori knowledge of the pseudo-random sequence 404. In an example, the receiver 308 can include the random number generator and seed value that is used by the radar transmitter to generate the pseudo-random sequence 404.

The receiver 308 receives a spread spectrum signal 508 output by the radar transmitter, and the spread spectrum signal 410 is retained in the memory 504 (which may be or include a buffer). The instructions 506 can include a demodulator component 510 that is configured to de-ramp the spread spectrum signal 410 (in the digital or analog domain) using the pseudo-random sequence 404, allowing for acquisition of the telemetry data 402. Based upon the foregoing, it can be ascertained that the approach described in FIGS. 4 and 5 is particularly well-suited for applications where the telemetry data rate approximately corresponds to the radar modulation bandwidth.

Figure 6:
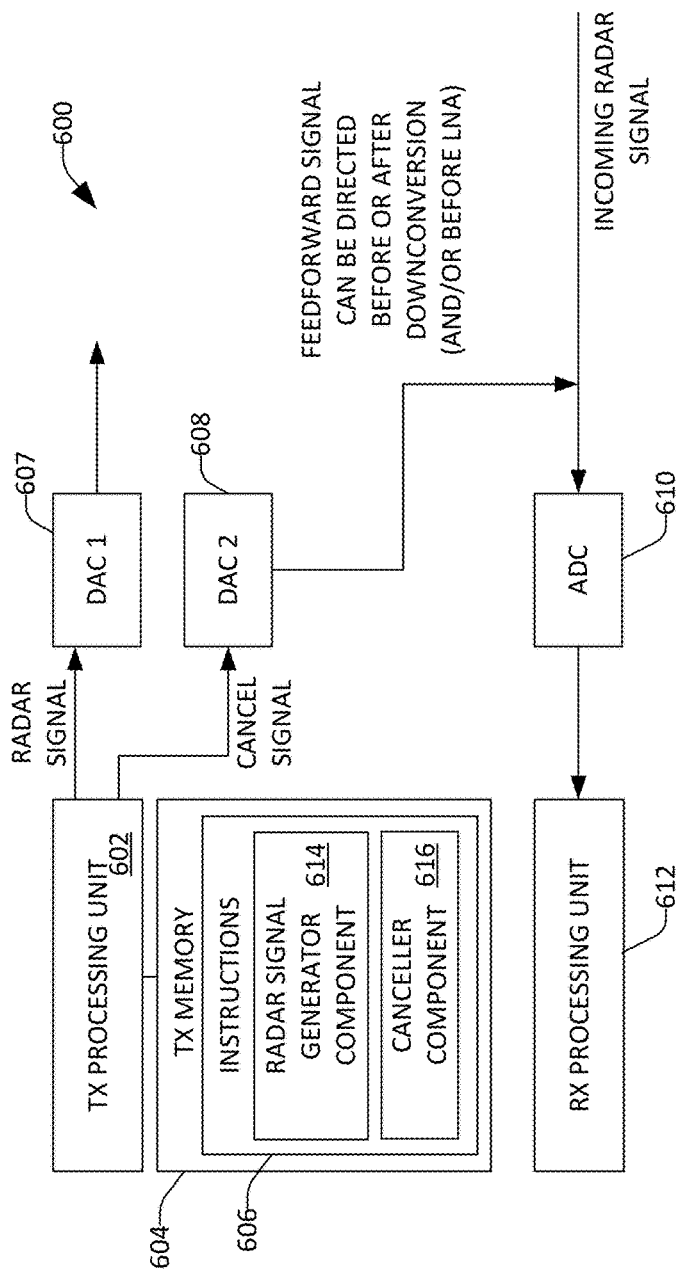
FIG. 6 is a functional block diagram of an exemplary spread spectrum radar system that is configured to simultaneously cancel multiple leakage paths between a radar transmitter and a radar receiver.

Now referring to FIG. 6, an exemplary radar system 600 (or a combined radar and telemetry system as described above) is illustrated, wherein the system 600 is configured to simultaneously cancel signal leakage over multiple leakage paths is illustrated. With more particularity, undesirable self-jamming can occur in radio frequency (RF) applications when transmit signal power leaks directly from an RF transmitter to an RF receiver. The system 600 is configured to generate a software-defined waveform that can be fed forward to a receiver to cancel transmitter leakage. Unlike conventional approaches, the system 600 can simultaneously cancel multiple leakage paths using a single feed forward signal.

The system 600 includes a transmit processing unit 602 (which may be the processing unit 102 referred to previously). The system 600 further includes a transmit memory 604 that includes instruction 606 that are executed by the transmit processing unit 602. The system 600 also includes a first DAC 607 that is in communication with the transmit processing unit 602 and a second DAC 608 is in communication with the transmit processing unit 602.

The system 600 further includes an ADC 610, which is configured to receive an incoming analog signal. As shown, the analog signal can be a combination of incoming radar signals and analog signals output by the second DAC 608. A receive processing unit 612 is configured to receive digital signals output by the ADC 610.

The instructions 606 include a radar signal generator component 608, which is configured to generate a transmit radar signal (radar waveform). The transmit processing unit 602 is configured to execute the radar signal generator component 608 and output digital radar signals to the first DAC 607. The instructions 606 additionally include a canceller component 616 that is configured to generate a respective leakage path cancellation signal for each leakage path between a transmitter and receiver of the system 600. The canceller component 616 can generate cancellation signals based upon known geometry of an apparatus that includes the system 600, proximity between a receive antenna and transmit antenna, materials out of which an apparatus is formed, etc. In an example, the canceller component 616 can directly detect the leakage to generate the cancellation signal (waveform), and the cancellation signal can be left running (particularly in radar and RFID applications). In another example, the canceller component 616 can solve for leakage as a continuous optimization problem. In yet another example, the canceller component 616 can replace or augment an analog cancellation loop. Other undesired signals, such as blockers, jammers, or interferers, can also be cancelled.

When the transmit processing unit 602 executes the canceller component 616, the transmit processing unit 602 outputs a digital cancellation signal that is configured to cancel multiple leakage paths simultaneously. The second DAC 608 receives the digital cancellation signal and outputs an analog cancellation signal. The analog cancellation signal is fed forward to the ADC 610, such that it is combined with an incoming analog signal that is based upon a reflected radar signal received up by a receive antenna. The ADC 610, based upon the two signals, outputs a digital signal for provision to the receiving processing unit 612. Because the cancellation signal is software-defined, the cancellation signal output by the transmit processing unit 602 can simultaneously cancel multiple leakage paths between the receiver and transmitter of a radar system or combined radar and telemetry system.

While the system 600 has been described as the analog cancellation signal being provided to the input of the ADC 610, it is to be understood that the system 600 can be modified such that the analog cancellation signal is input to other elements of a radar receiver. For example, the analog cancellation signal can be provided at the input of a LNA. In another example, the analog cancellation signal can be provided to the input of a mixer. The placement of the analog cancellation signal in the receiver at different locations has different advantages and disadvantages. For example, if the waveform feeds forward after the downconversion process, the max waveform frequency and/or required bandwidth would be less. If the waveform feeds forward before the downconversion process (or even before the LNA), the feedforward waveform can also mitigate the effect of gain desensitization and distortion due to the undesired leakage. Additionally, the techniques referenced above for cancelling leakage over multiple leakage paths using a single cancellation signal are applicable to RFID systems, full duplex communications systems, and the like. Further, the system 600 can be adapted to cancel clutter, blockers, and interferers.

Figure 7:
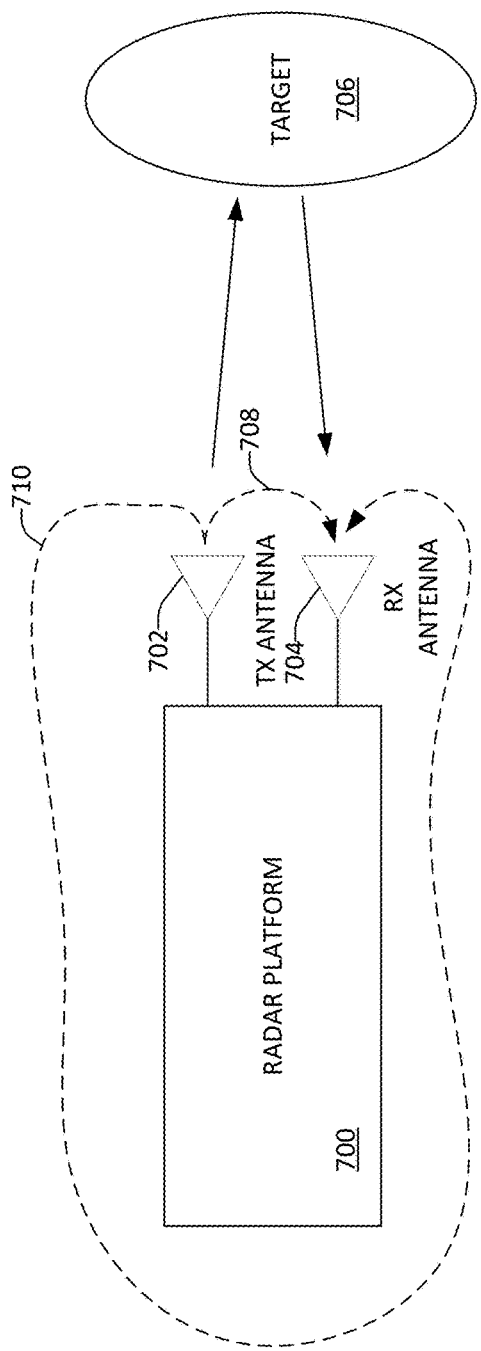
FIG. 7 illustrates exemplary leakage paths in a radar platform.

Referring now to FIG. 7, a radar platform 700 that has multiple leakage paths between a radar transmitter and radar receiver are shown. The radar platform 700 includes a transmit antenna 702 and a receive antenna 704. Ideally, the transmit antenna 702 emits a radar signal towards a target 706, and at least a portion of the radar signal is reflected back from the target 706 and received by the receive antenna 704. Leakage paths between the transmit antenna 702 and the receive antenna 704, however, may result in self-jamming. In this example, there are two leakage paths. A first leakage path 708 that takes a shortest route between the transmit antenna 702 and the receive antenna 704, and a second leakage path 710 that goes in the opposite direction (around the radar platform 700). As indicated previously, the cancellation signal output by the transmit processing unit 602 can simultaneously cancels the first leakage path 710 and the second leakage path 712.

FIGS. 8-11 illustrate exemplary methodologies relating to radar and/or telemetry systems. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 8:
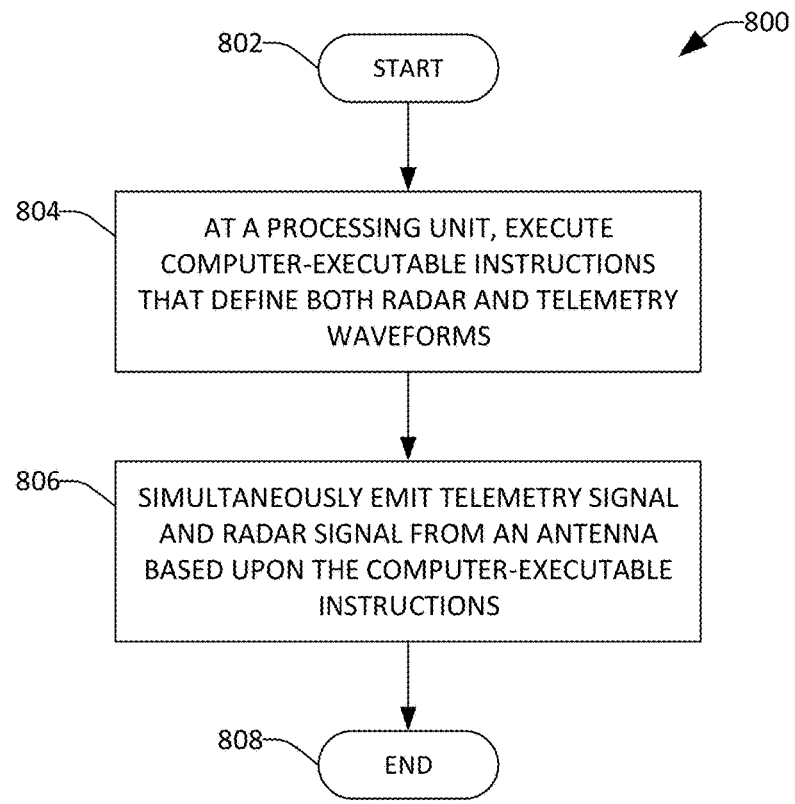
FIG. 8 is a flow diagram that illustrates an exemplary methodology for simultaneously transmitting a telemetry signal and a radar signal.

Now referring to FIG. 8, an exemplary methodology 800 that facilitates simultaneously emitting a telemetry signal and radar signal from an antenna is illustrated. The methodology 800 starts at 802, and at 804, at a processing unit, computer-executable instructions are executed that define both radar and telemetry waveforms (which are overlapping in time). As indicated previously, these waveforms can be defined in software, and can be combined to form a baseband waveform.

At 806, a telemetry signal and radar signal are simultaneously emitted from an antenna based upon the computer-executable instructions executed at 804. The methodology 800 completes at 808.

Figure 9:
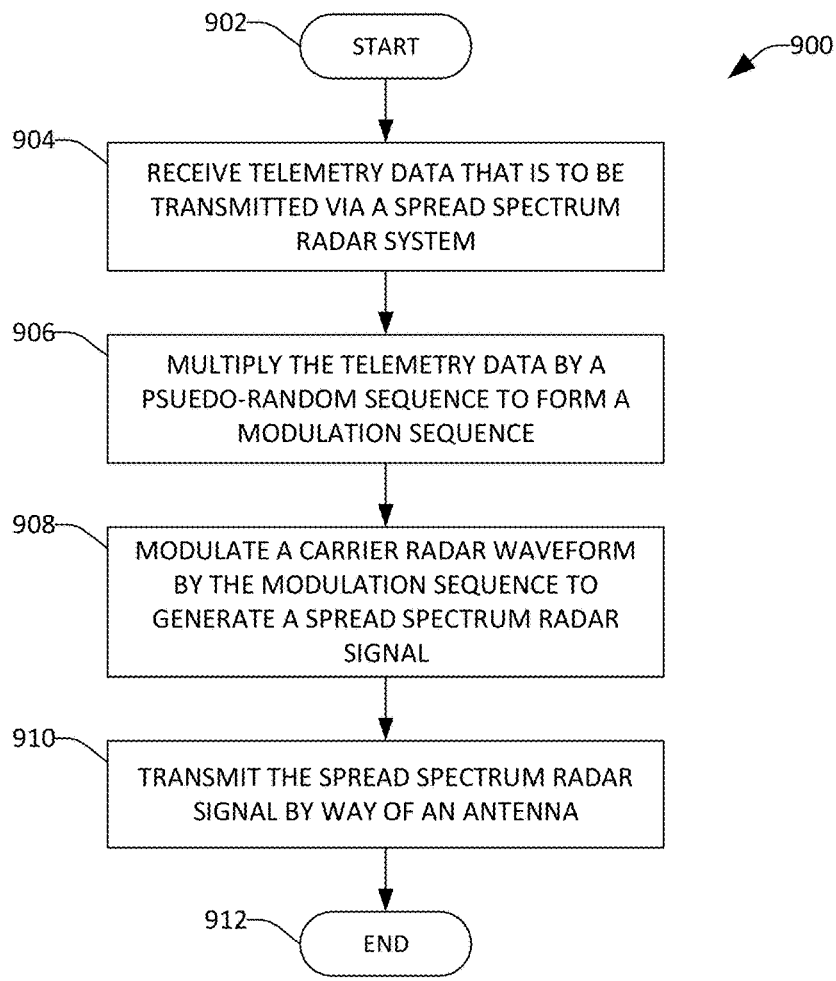
FIG. 9 is a flow diagram that illustrates an exemplary methodology for encoding telemetry data in a spread spectrum radar signal.

Now referring to FIG. 9, an exemplary methodology 900 that facilitates encoding telemetry data in a spread spectrum radar signal is illustrated. The methodology 900 starts at 902, and at 904, telemetry data that is to be transmitted by way of a spread spectrum radar system is received. At 906, in an example, the telemetry data is multiplied by a pseudo-random sequence, thereby forming a modulation sequence. At 908, a carrier radar waveform is modulated by the modulation sequence formed at 906, thereby generating a spread spectrum radar signal (which is modulated based upon the telemetry data). At 910, the spread spectrum radar signal is transmitted by way of an antenna, and the methodology 900 completes at 912.

Figure 10:
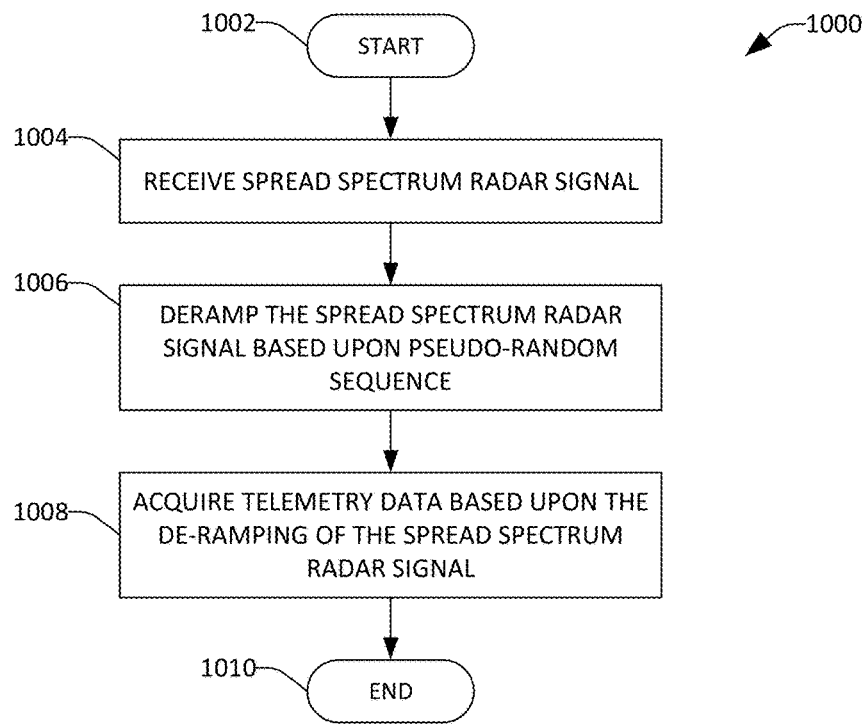
FIG. 10 is a flow diagram that illustrates an exemplary methodology for decoding telemetry data encoded in a spread spectrum radar signal.

Turning now to FIG. 10, an exemplary methodology 1000 that facilitates acquiring telemetry data that has been encoded in a spread spectrum radar signal is illustrated. The methodology 1000 starts at 1002, and at 1004 a spread spectrum radar signal is received. At 1006, the spread spectrum radar signal is de-ramped based upon the pseudo-random sequence referenced above with respect to FIG. 9. At 1008, telemetry data is acquired based upon the de-ramping of the spread spectrum radar signal. As described above, the modulation sequence is based upon both the pseudo-random sequence and telemetry data. Accordingly, de-ramping the radar signal using the pseudo-random sequence allows for the telemetry data to be determined. The methodology 1000 completes at 1010.

Figure 11:
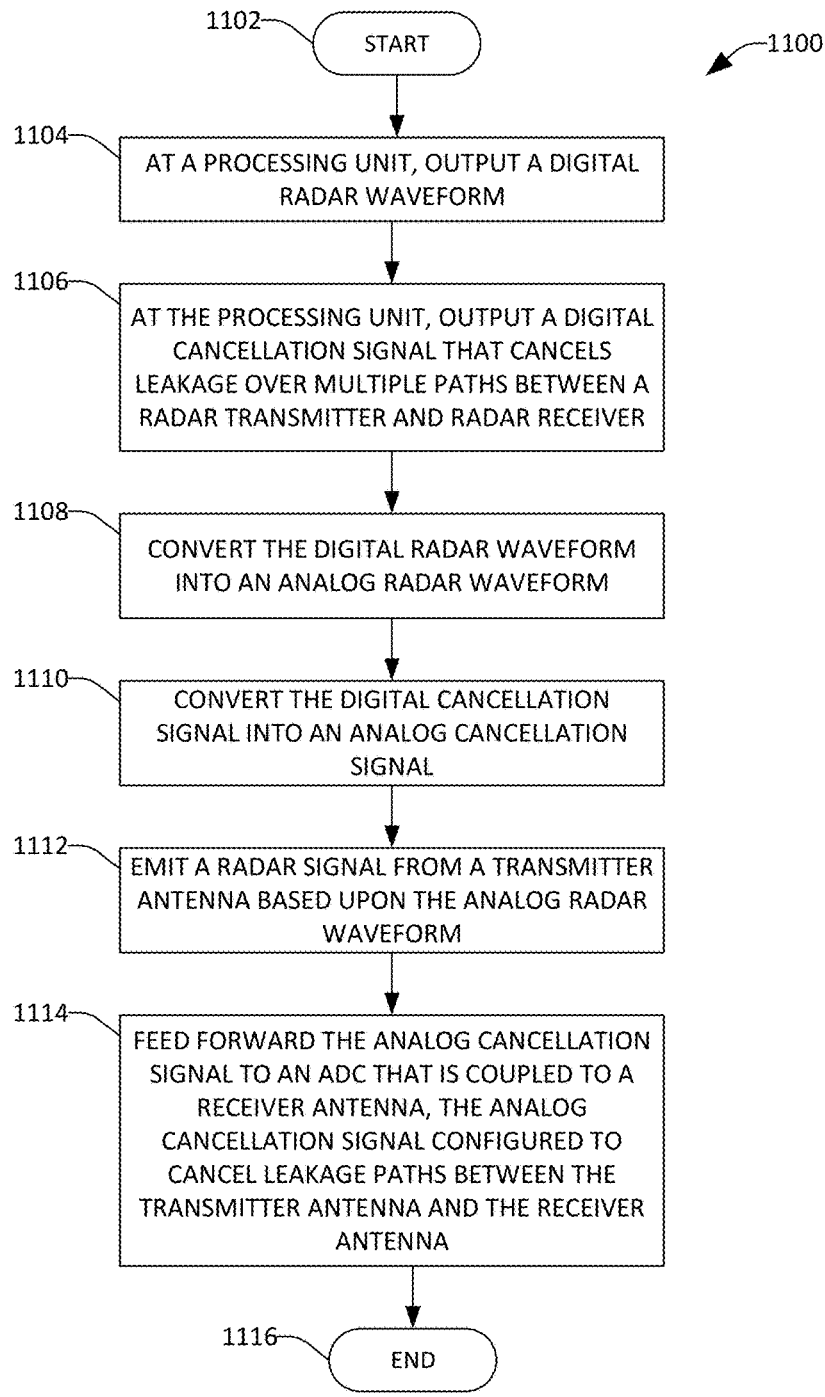
FIG. 11 is a flow diagram that illustrates an exemplary methodology for simultaneously canceling multiple leakage paths between a radar transmitter and a radar receiver.

Referring now to FIG. 11, an exemplary methodology 1100 that facilitates simultaneously canceling multiple leakage paths is illustrated. The methodology 1100 starts 1102, and at 1104, at processing unit, a digital radar waveform is output. At 1106, at the processing unit, a digital cancellation signal is output, wherein the cancellation signal is configured to cancel multiple paths simultaneously.

At 1108, the digital radar waveform is converted to an analog radar waveform, and at 1110, the digital cancellation signal is converted to an analog cancellation signal. At 1112, a radar signal is emitted from a transmitter antenna based upon the analog radar waveform generated at 1108. At 1114, the analog cancellation signal is fed forward to an ADC that is coupled to a receiver antenna, wherein the analog cancellation signal is configured to cancel multiple leakage paths between the transmitter antenna and the receiver antenna. The methodology 1100 completes at 1116.

Examples

A prototype combined radar and telemetry system was built, which transmitted a 200 ns pulse with a 1 MHz pulse repetition frequency. A pseudo-random noise sequence was used to chip or modulate the transmitted pulse. Each transmitted pulse included 20 chips, with each chip being 10 ns in duration, resulting in a transmitted bandwidth of 100 MHz. An 8-bit phase code was used for the prototype—an implemented system would use a much longer phase code to avoid range ambiguity. The hardware of the prototype can support bandwidths of 200 MHz or higher, but the current design of the Doppler and integration filters in the radar processor would not be able to take advantage of the improved time resolution. The telemetry transmitter was configured to transmit a 1 MHz PCM/FM test pattern. It was modulated digitally to a pass-band of 2250.5 MHz, which is one of the standard telemetry bands. The center frequency could be changed by modifying firmware. A summary of transmitter design parameters utilized when constructing the prototype is shown below in Table 1.

TABLE 1

| TELEMETRY TRANSMITTER | |
|---|---|
| Modulation | PCM/FM |
| Data Rate | 1 Mbps |
| Center Frequency | 2250.5 MHz |

| RADAR TRANSMITTER | |
|---|---|
| PRF | 1 MHz |
| Duty Cycle | 20% |
| Pulse Compression | 20 chips/pulse |
|  | 10 ns/chip (100 MHz BW) |
|  | 8-bit phase code |
| Doppler | 2.3 kHz to 30 kHz |

Figure 12:
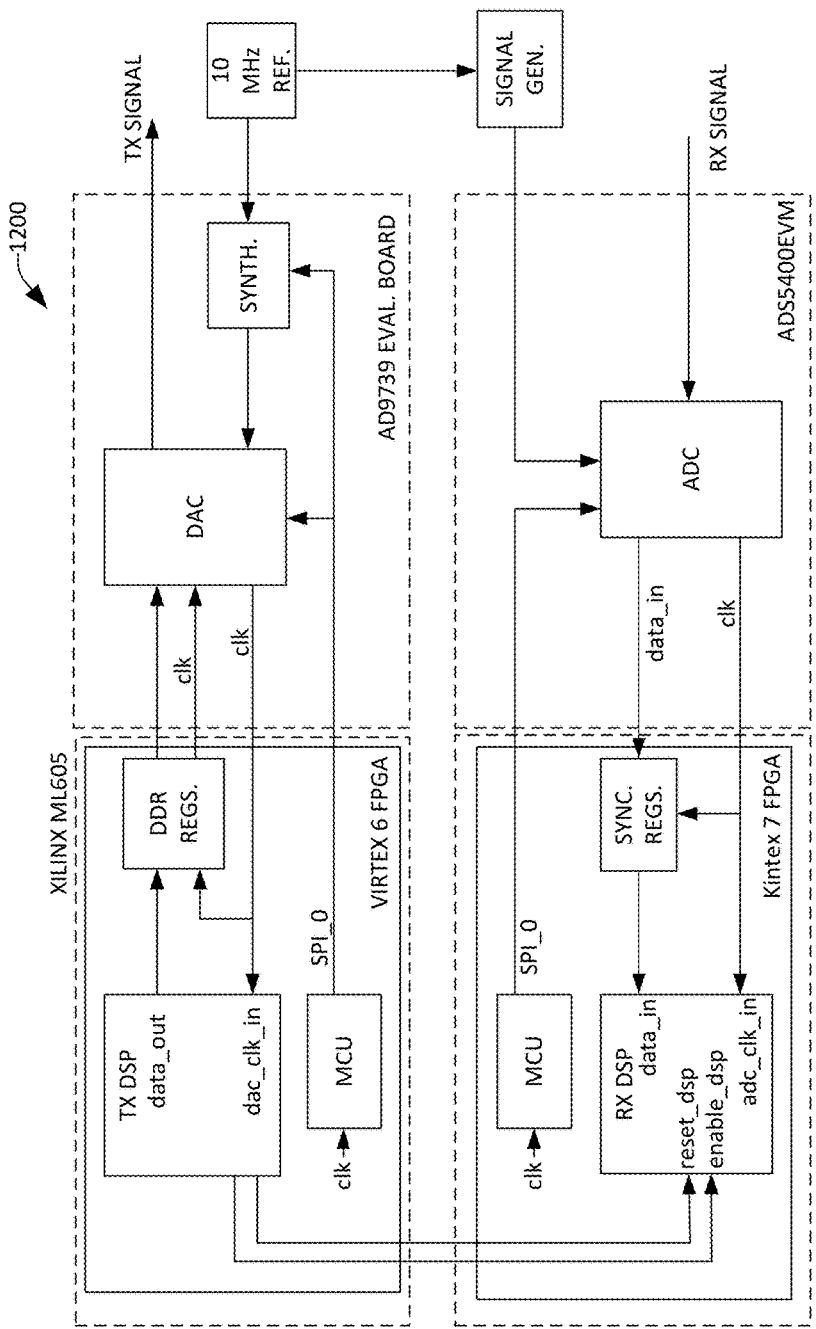
FIG. 12 is a block diagram of an exemplary combined radar and telemetry system.

Commercial development hardware was leveraged to build the prototype. The radar design was split between two FPGA development boards. A first board was configured to implement a combined radar and telemetry transmitter, while a second board was configured to implement the radar receiver. It is to be understood that the prototype could have been modified to implement the transmitter and receiver on a single board with a single FPGA (or other processing unit). FIG. 12 is a functional block diagram 1200 of the exemplary prototype. As mentioned above, the prototype included two boards: a transmitter board was a XILINX ML605 development board with a VIRTEX 6 FPGA and an Analog Devices AD 9739 DAC daughter card (2.5 GS/S and 14-bit resolution). A receiver board was a XILINX KC705 development board with a KINTEX 7 FPGA 1308 and a TI ADS5400 ADC 1310 daughter card (1GS/S 2.1 GHz analog bandwidth, 12-bit resolution).

Figure 13:
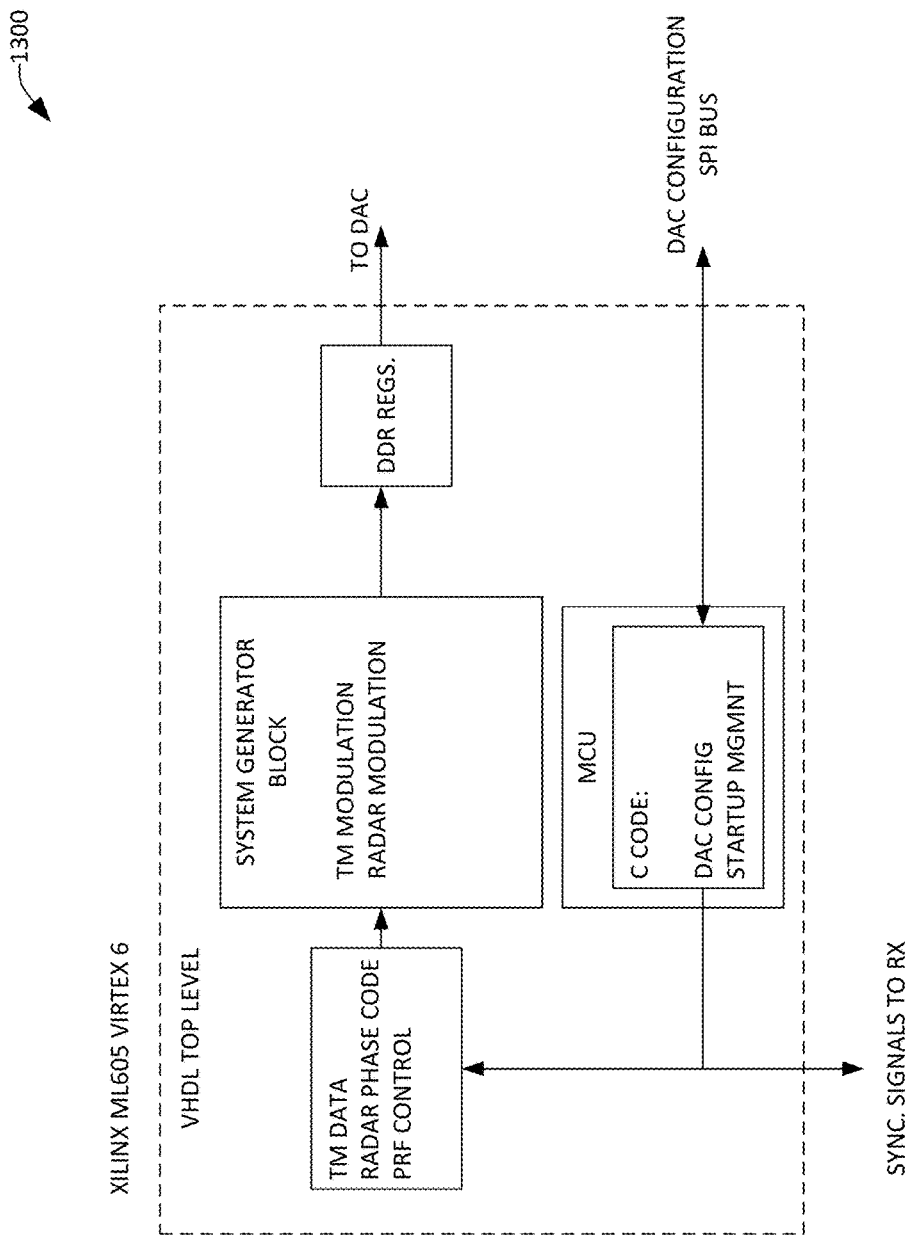
FIG. 13 is a block diagram that illustrates an exemplary partitioning of digital signal processing functions for a radar and telemetry transmitter.
Figure 14:
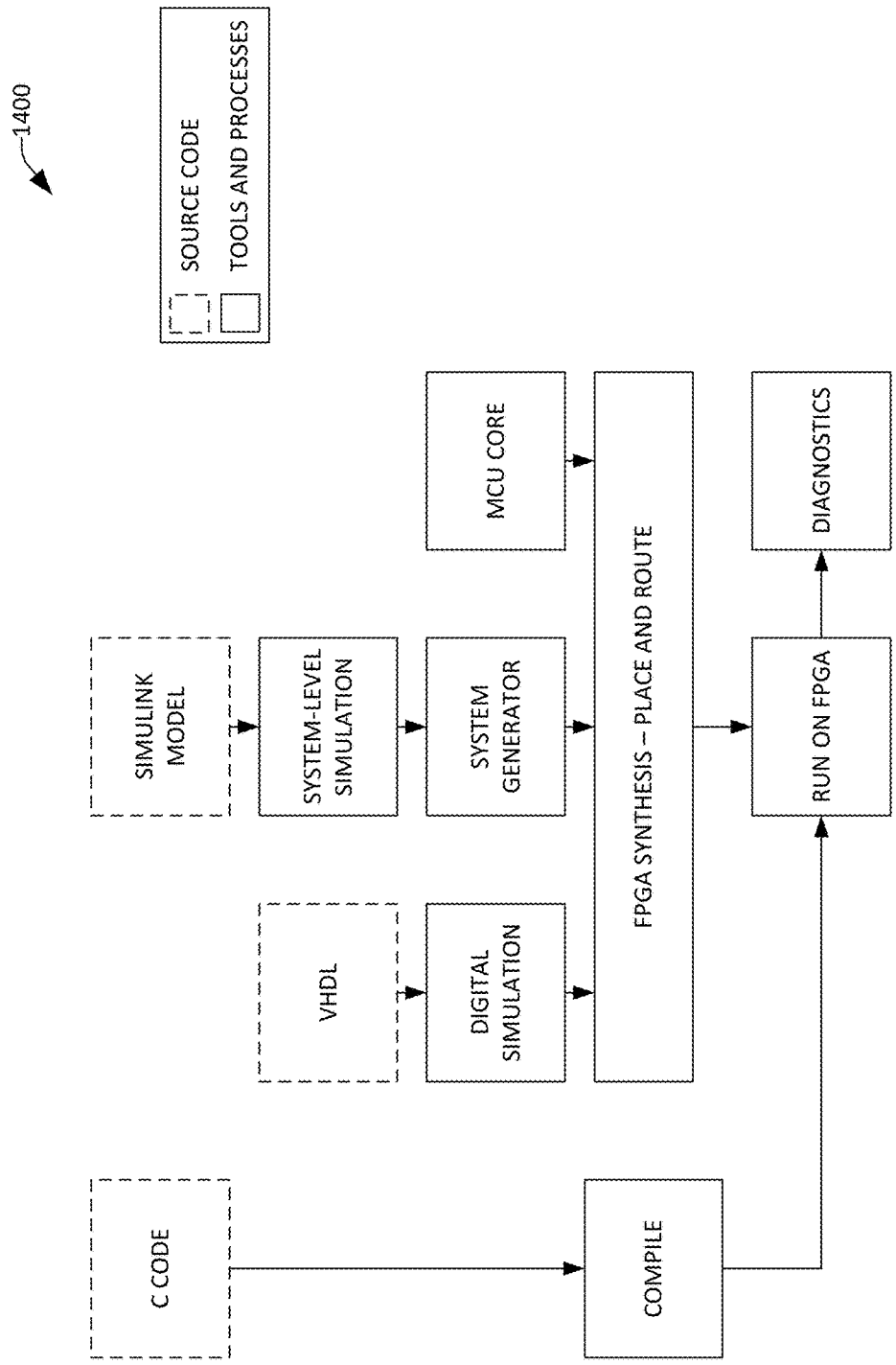
FIG. 14 is a block diagram that depicts software development tools utilized to compile source files.

Transmitter firmware design was partitioned generally into three categories: 1) digital signal processing (DSP); 2) configuration code; and 3) general logic. Xilinx SYSTEM GENERATOR was used to generate VHDL code from high level SIMULINK models for the DSP algorithms, an embedded MICROBLAZE microprocessor was programmed using C code to handle configuration tasks, and standard VHDL code was used at the top level of the design to implement glue logic and phase code synchronization. FIG. 13 is a block diagram 1300 that illustrates how the functions were partitioned, and FIG. 14 is a block diagram 1400 that illustrates the tools used to compile the source files.

Figure 15:
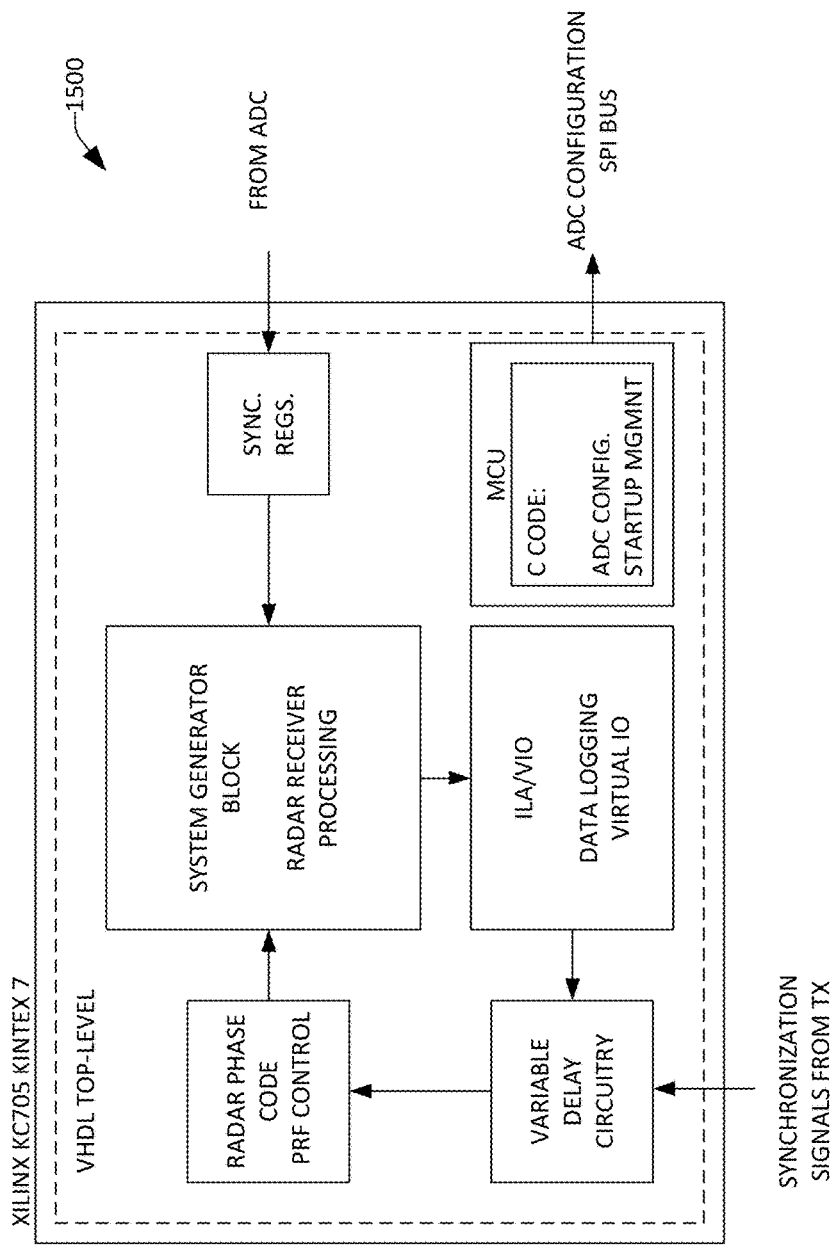
FIG. 15 is a block diagram that illustrates an exemplary partitioning of software design for a radar receiver.

FIG. 15 is a block diagram 1500 that illustrates how software design in the receiver was partitioned. In-logic analyzer (ILA) and virtual input output (VIO) blocks were included for debugging purposes. With these blocks in place, intermediate values from the radar processing blocks could be recorded, active filter banks could be selected, and triggering thresholds could be changed while the design was running.

Returning to FIG. 12, the transmitter and receiver board were synchronized to a common 10 MHz reference oscillator. The DAC daughter card included a PLL frequency synthesizer that generated the 1.6 GHz DAC clock. The ADC daughter card required an external sampling reference, so a bench top signal generator was used to create an 800 MHz clock. Because both halves of the design were clocked to the same 10 MHz reference, there was no relative frequency drift.

As part of the radar design, the transmitted pulses were chipped with a pseudo-random phase code. This phase code was synchronized between the transmitter and the receiver so that the reflected signal could be properly detected at the receiver. In the exemplary prototype, the phase code was generated independently in both the transmitter and receiver FPGAs. The start of the phase code sequence was coordinated by a single enable signal sent from the transmitter to the receiver. The enable signal was delayed in the receiver design to correspond to a desired range.

Figure 16:
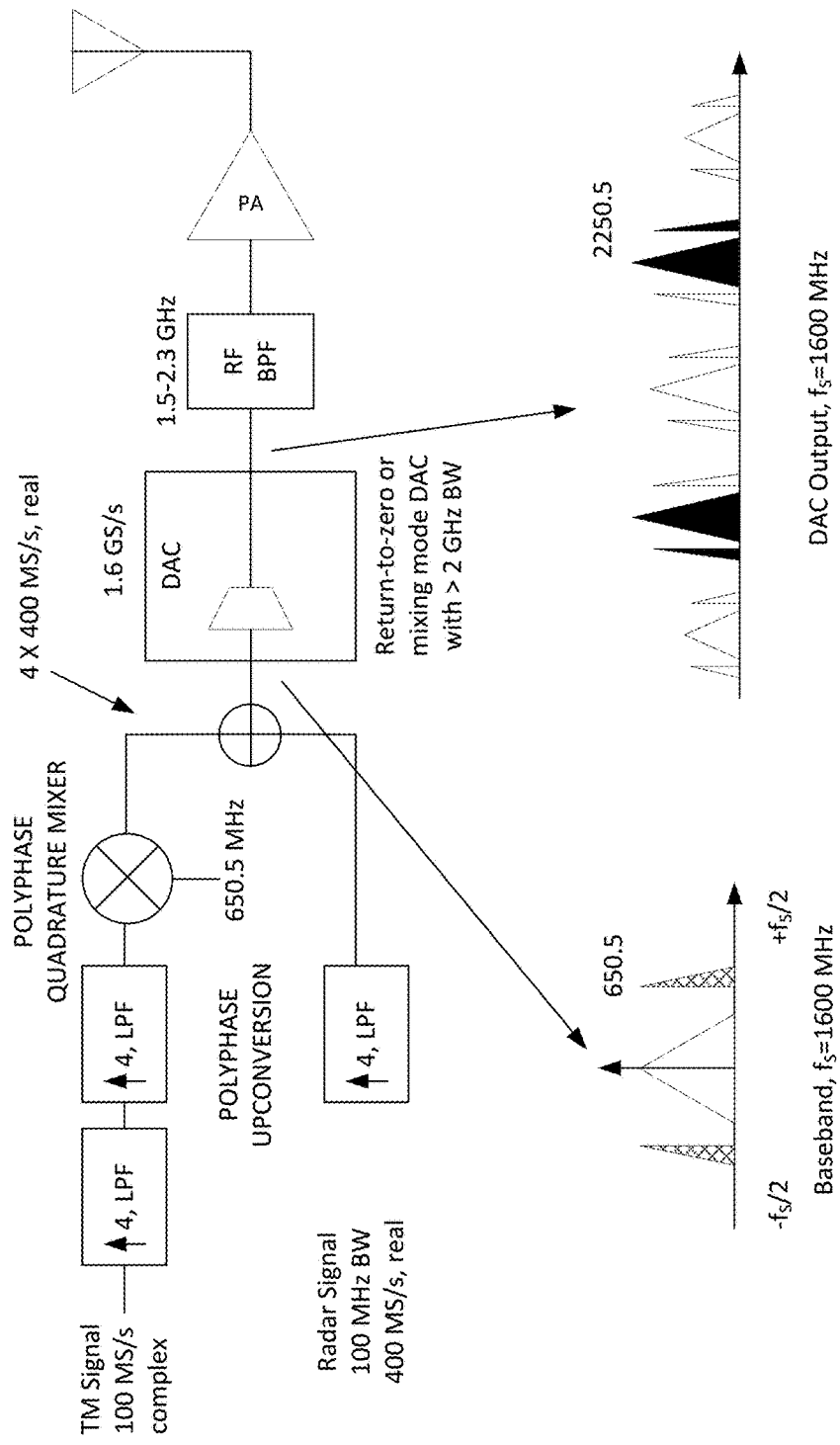
FIG. 16 illustrates polyphased portions of a digital architecture.

The transmitter FPGA was responsible for generating both the baseband radar and baseband telemetry signals. In this exemplary prototype, the DAC was operated at 1.6 GS/s, meaning that it could support 800 MHz of output bandwidth at baseband. The harmonics generated from operating the DAC in mixing mode were relied upon to place signals into the proper frequencies at passband. The goal was to place the radar signal at 1600 MHz (L band) and center the telemetry signal at 2250.5 MHz. To accomplish this, coming out of the DAC, the radar signal was centered at 0 Hz and the telemetry signal was centered at 650.5 MHz. FIG. 16 illustrates the frequency plan and harmonics used to generate the passband signal. In FIG. 16, the transmitted part of the spectrum is shaded darker than the non-transmitted part of the spectrum.

Based on the bit resolution and computations required, the maximum clock rate of circuitry on the FPGA was between 400 MHz and 450 MHz. In order to support the 1.6 GS/s required to feed the DAC, data was synthesized using four parallel 400 MS/s data streams. This is referred to as a polyphase architecture, because each data stream is offset by a fraction of a sample, such that they align when multiplexed into a single data stream. Polyphased portions of the digital architecture are highlighted with thicker lines in FIG. 16.

Data was fed into the DAC over two 400 MHz double data rate (DDR) channels. DDR protocols provide data on both the rising and falling edge of the clock. The XILINX VIRTEX 6 FPGA included DDR registers and specialized output buffers to facilitate the data transfer. The compiled DSP circuitry for the design could make timing at 400 MHz. If a slower FPGA was used, or if the processing became more complicated requiring slower clocking, it would have been possible to parallelize the DSP processing further. The filters and upconversion steps could have been parallelized by eight and run at 200 MHz, for example.

The DSP portions of the transmitter design, modulation, upsampling, filtering, and upconversion were all implemented using MATHWORKS SIMULINK combined with XILINX SYSTEM GENERATOR. Building the model in SIMULINK allowed rapid verification of the design using floating and fixed point arithmetic. SYSTEM GENERATOR is a plug-in to SIMULINK that allows the conversion of models into VHDL (or Verilog) code for implementation in an FPGA.

Figure 17:
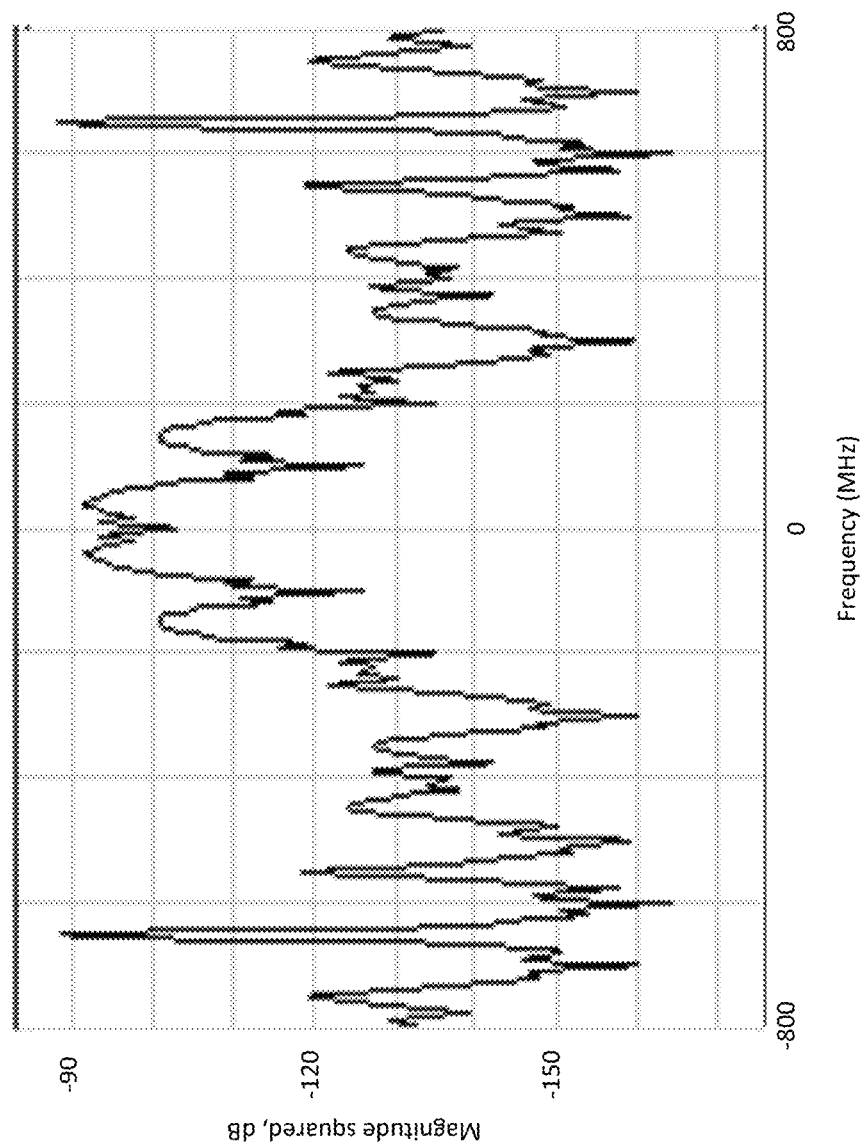
FIG. 17 illustrates an exemplary baseband output.

High-level modeling in SIMULINK allowed tuning of the interpolation filters and IQ-upconversion steps using fixed point arithmetic. The baseband output of the design is shown in FIG. 17. As designed, the narrowband PCM/FM telemetry signal was at 650.5 MHz, while the wideband BPSK radar signal was centered at DC spanning 100 MHz (200 MHz if the first side lobes are included).

The PCM/FM modulator was originally coded in SIMULINK based on wave-table synthesis. The design was directly translated into SYSTEM GENERATOR.

Figure 18:
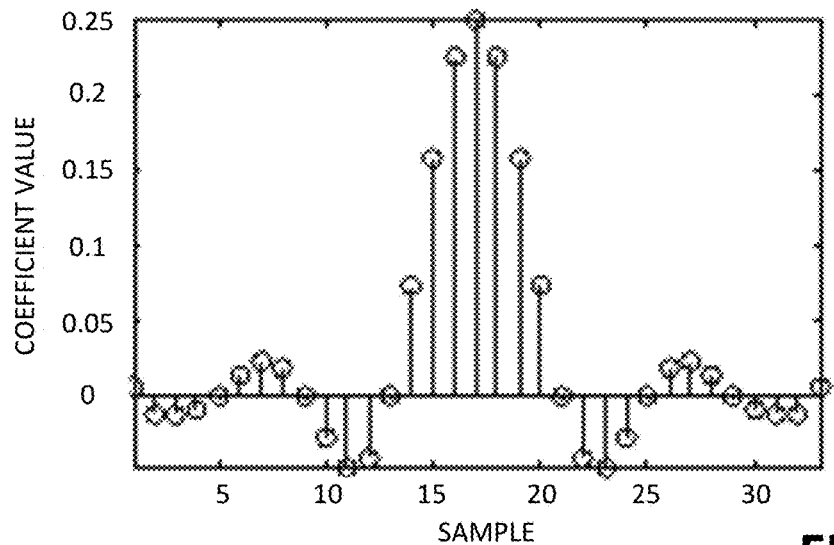
FIGS. 18 and 19 are plots of filter coefficients and frequency responses for ¼ band FIR interpolation filters.
Figure 19:
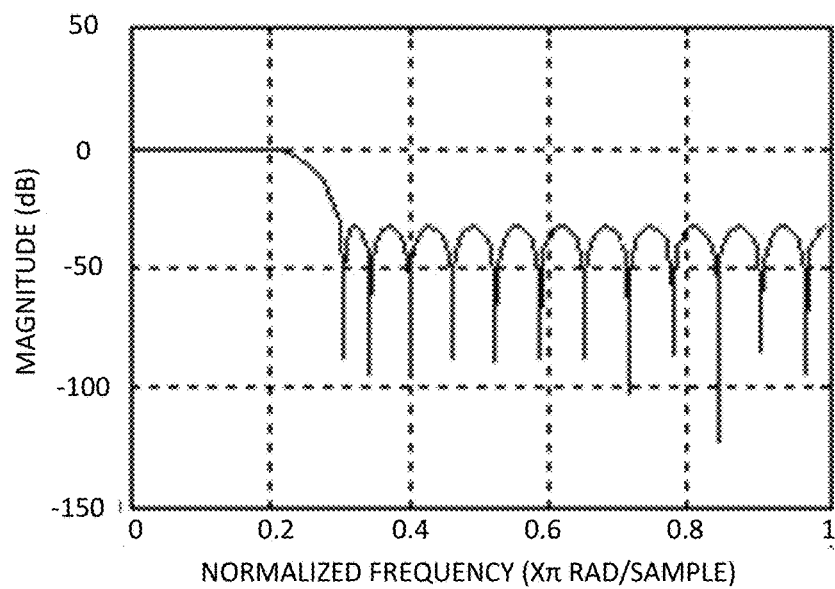

Interpolation filters in the transmitter design shared the same coefficients. Each filter was a 32nd order quarter-band FIR filter designed using the Parks-McClellan algorithm by calling the following command in MATLAB.
b=firpm(32, [0 0.2 0.3 1], [1 1 0 0]);

FIGS. 18 and 19 are plots of the filter coefficients and frequency responses for the ¼ band FIR interpolation filters.

Figure 20:
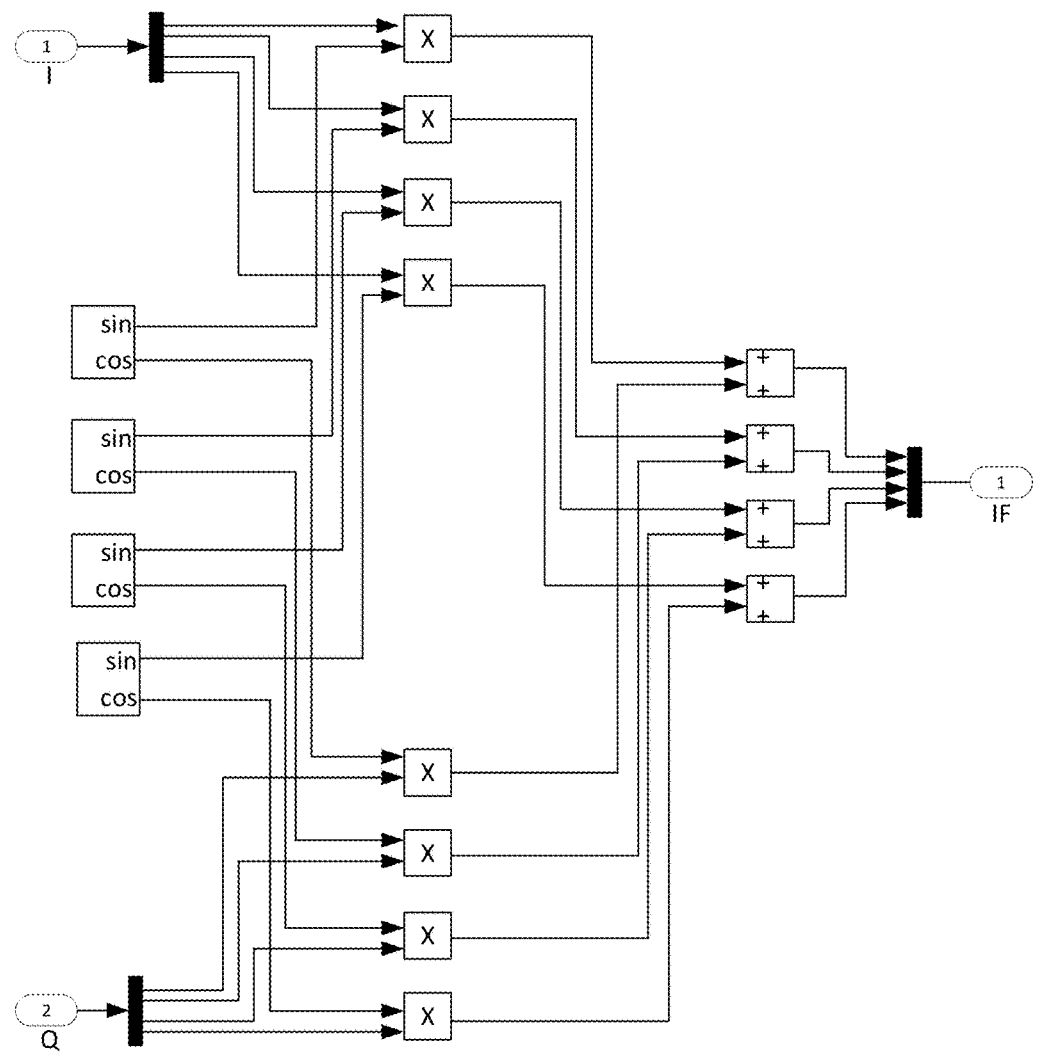
FIG. 20 illustrates a model for a quad tree mixer.

The baseband telemetry signal was upconverted from baseband to 650.5 MHz using quadrature mixing. The digital mixer combined the real and imaginary parts, while shifting the signal to the higher frequency, resulting in a purely real signal. At this point, the data was parallelized, so input to the quad tree mixer was four parallel real and imaginary data streams running at 400 MS/s each. FIG. 20 shows the SIMULINK model representation of the mixer.

Figure 21:
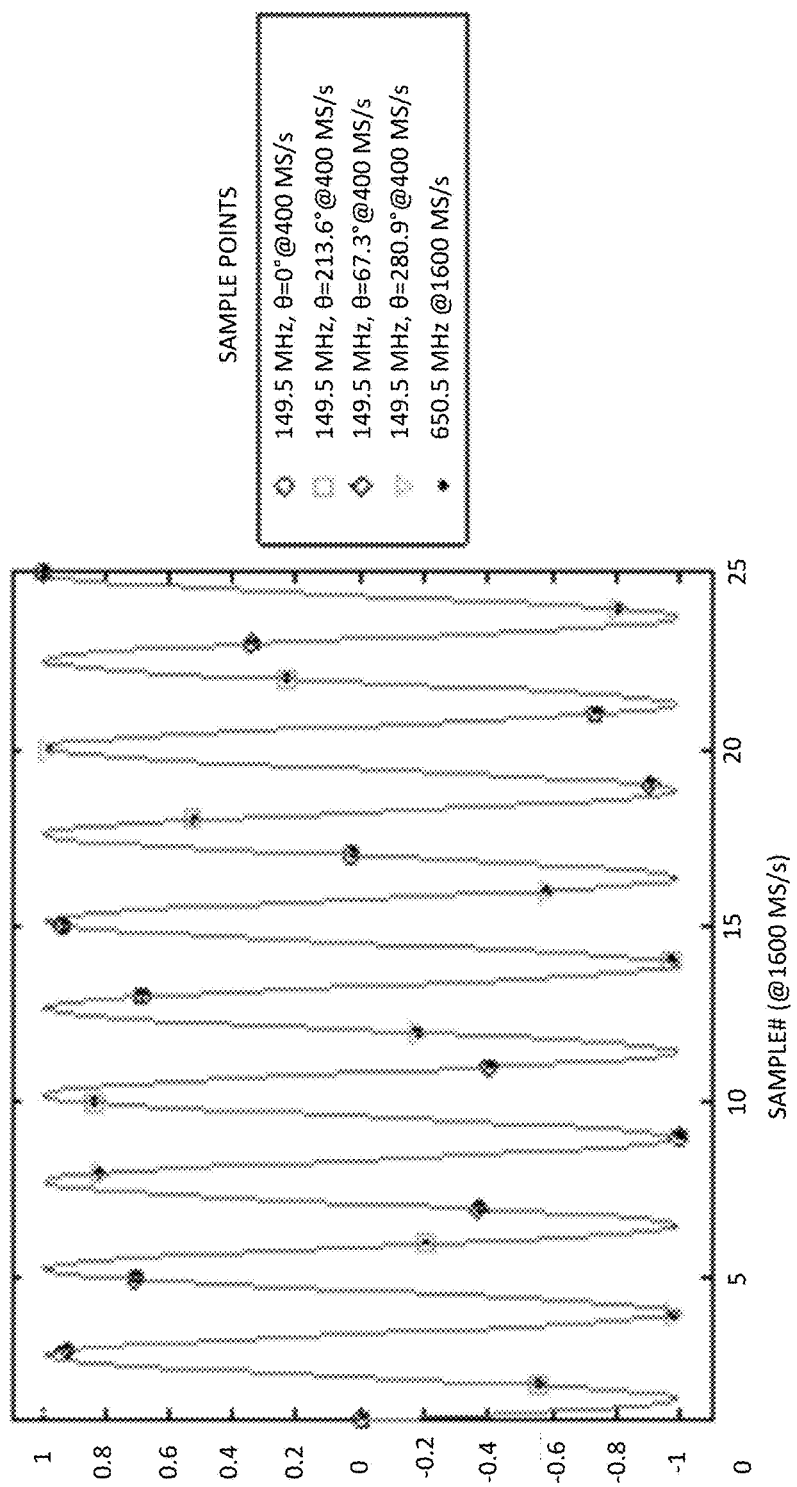
FIG. 21 illustrates interleaving of samples from four synthesizers.

To generate an equivalent 650.5 MHz mixing frequency for the four polyphase data streams, four frequency synthesizers were used, running at 149.5 MHz. Each had a slightly different phase shift. FIG. 21 shows how samples from the four synthesizers running at 400 MHz interleaved to become equivalent to sampling a 650.5 MHz tone at 1600 MHz. The equivalent frequencies were determined using a script written in MATLAB. The script is configured to find frequencies and phase shifts that are compatible with XILINX frequency synthesizers. The calculated frequencies and phase shifts were entered into the DDS compiler blocks. A lookup table-based DDS architecture was selected for this design.

Figure 22:
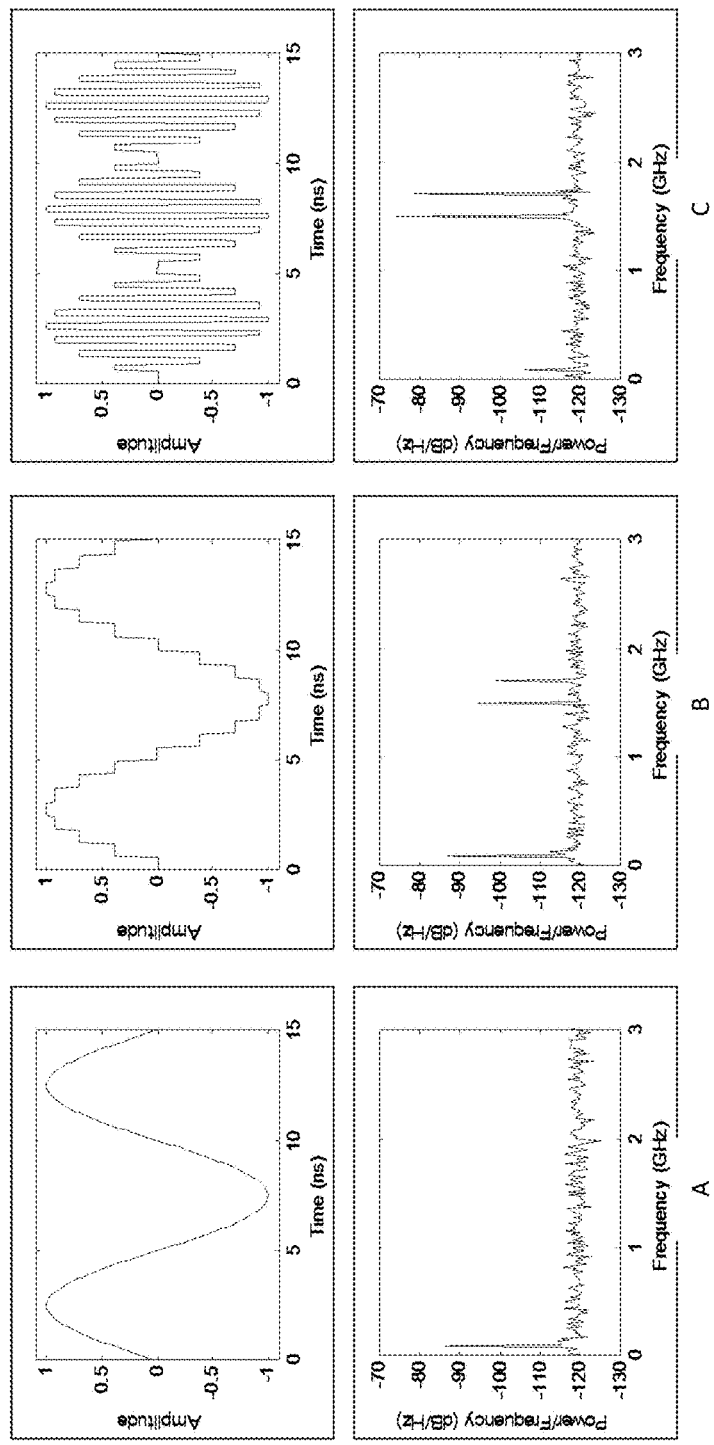
FIG. 22 illustrates an exemplary mixing mode operation.
Figure 23:
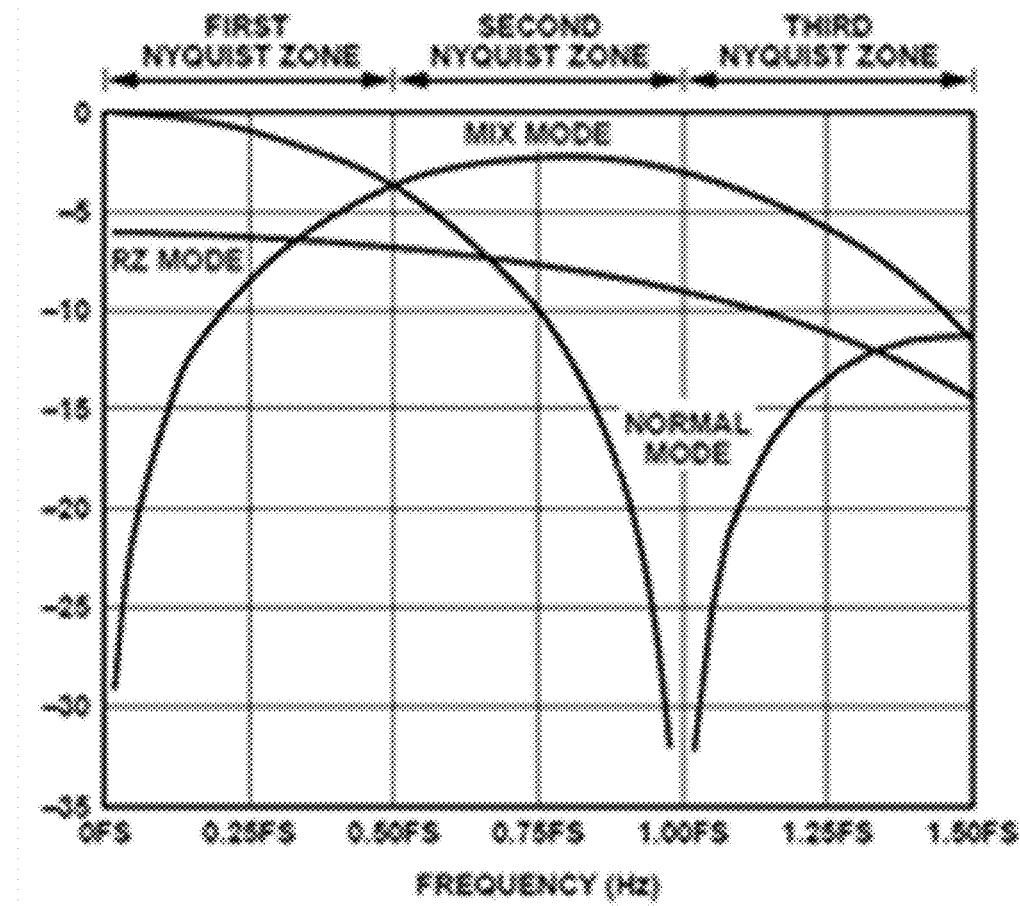
FIG. 23 illustrates attenuated signals near a set sample rate.

As mentioned previously, the DAC was capable of 14-bit resolution at 2.5 GS/s. In standard operation, this allows direct synthesis of a signal with a bandwidth from DC to 1.25 GHz. In mixing mode, the operation bandwidth shifts to 1.25 GHz to 3.0 GHz. An example of mixing mode operation is shown in FIG. 22. The ideal 100 MHz tone shown in FIG. 22A has a discrete sample period, however, and the actual output for an ideal DAC running at 1.6 GS/S is shown in FIG. 22B. Typically, the stairstep output is low-pass filtered to remove the higher frequency harmonics at 1.5 GHz and 1.7 GHz. However, because these harmonics were relied upon to generate a passband signal, these higher frequency components instead were accentuated. The power output in this normal operating mode, however, was impacted by a sinc-shaped rolloff (due to the pulse-shaped output waveform). Signals near the sample rate were attenuated, as shown in FIG. 23. The DAC provided an alternate mode of operation called mixing mode that is designed to address this issue. In this mode, each output sample is halved in duration. The polarity of the second half is then flipped, as illustrated in FIG. 22C. Mixing mode allowed the radar signal and telemetry signals to be generated at baseband, and then moved directly to passband, using the DAC. Alternatively, a DAC running faster than 4.5 GS/s could have been used.

Figure 24:
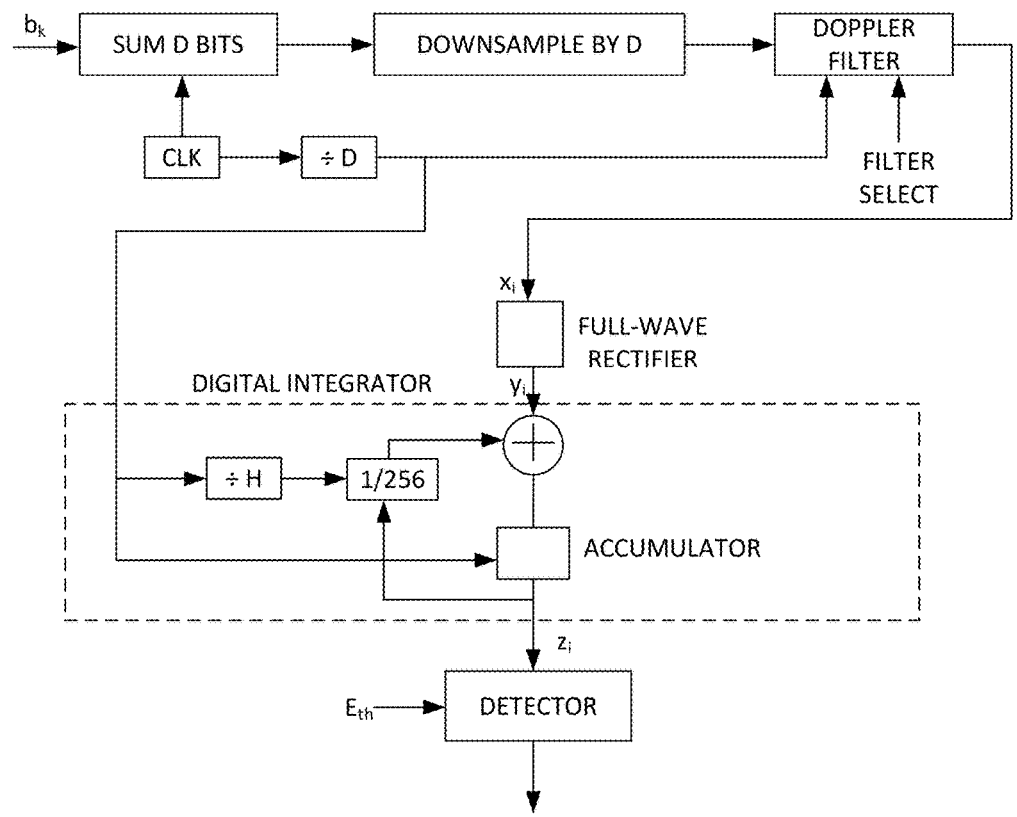
FIG. 24 illustrates exemplary processing of data by a radar system.
Figure 25:
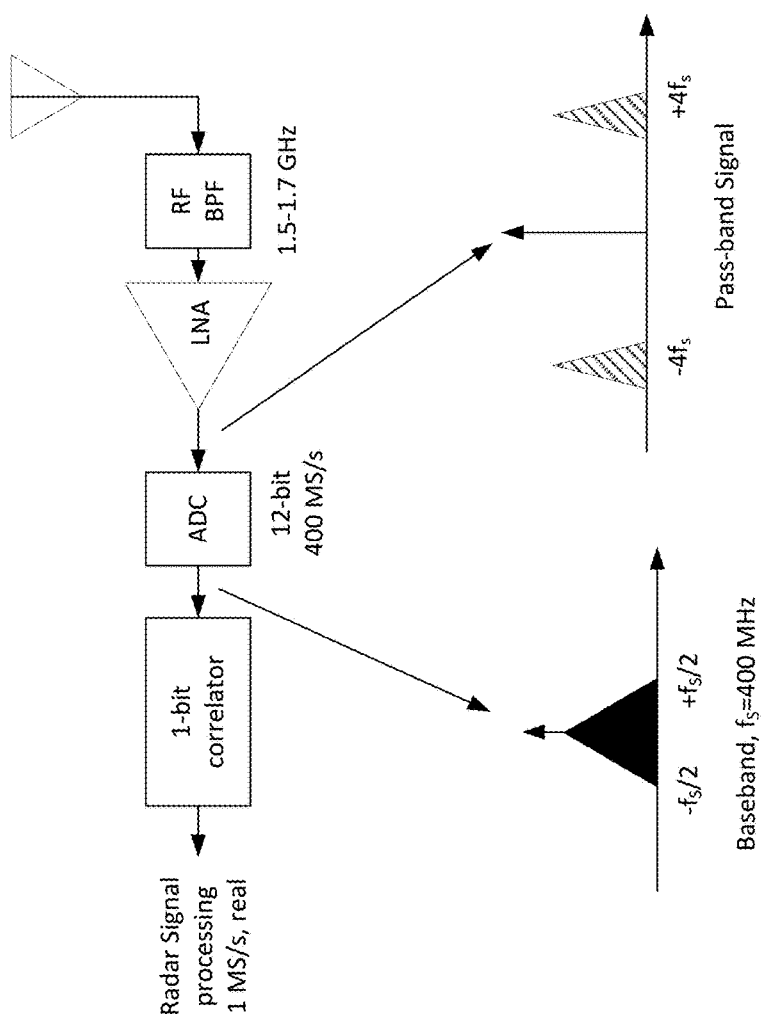
FIG. 25 illustrates aliasing of a signal to bandpass.

Direct sampling at the receiver is now described. An exemplary radar system processes 1-bit ADC data at the PRF rate, as shown in FIG. 24. The range and expected velocity were fixed. Before this block diagram, the data bits would have already been multiplied with the appropriately delayed phase code. The Doppler filter was tuned for a single Doppler frequency. The radar receiver used a direct sampling architecture, meaning that the passband signal at 1.6 GHz was sampled at 400 MHz after bandpass filtering. The signal was aliased down to bandpass, as shown in FIG. 25.

Figure 26:
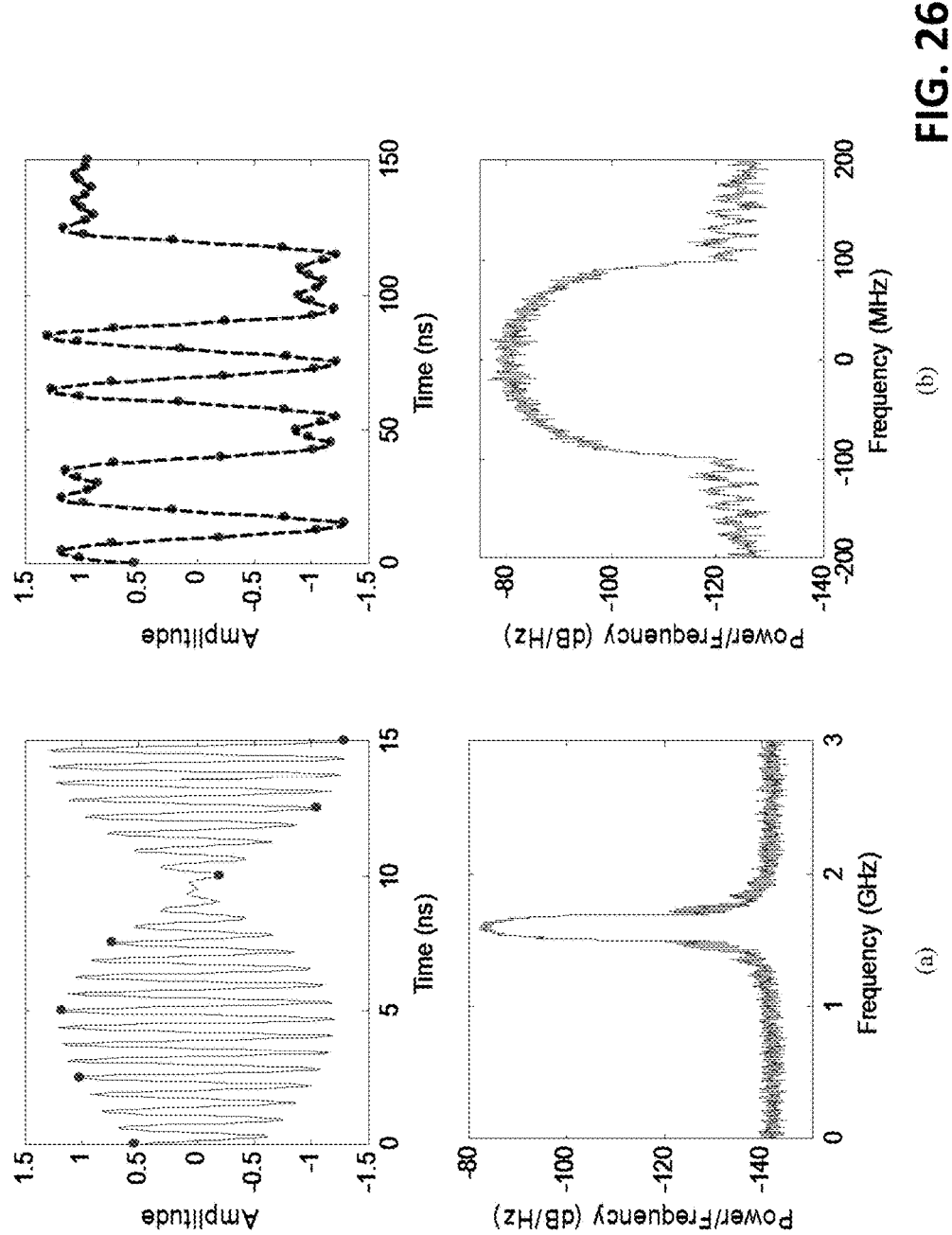
FIG. 26 are graphs illustrating workability of direct sampling.

FIG. 26 illustrates how direct sampling worked using simulated data that was constructed to look like a transmitted radar signal. FIG. 26(*a*) shows the signal and spectrum of a 100 MHz BPSK modulated signal at 1.6 GHz passband. If the waveform is been sampled at 400 MS/s, the BPSK signal is reconstructed as shown in FIG. 26(*b*). The block-dashed overlay represents the original baseband signal. It can be noted that the example shows ideally timed sampling, and thus, ideal reconstruction. If the 400 MHz subsamples were delayed a fraction of a period, it would be possible to hit all the zeroes or something in between. This phase alignment may cause a reduction in amplitude for the reconstructed signal. For radar, this is not a problem because the delay constantly shifts as a distance between the system and a target decreases. This is the same phenomenon as Doppler shift. The Doppler frequency appears in the reconstructed signal and at the output of the correlator.

It can further be noted that the design included aliasing directly to DC. For communication applications, it is more common to sample, such that the signal center frequency lands at $F_s/4$ instead of at DC, where $F_s$ is the sampling frequency. Digital quadrature down conversion techniques would then be used to arrive at a complex baseband signal. This design decision leads to a small performance penalty (3 DB) and results in the loss of information about the direction of the Doppler shift.

Figure 27:
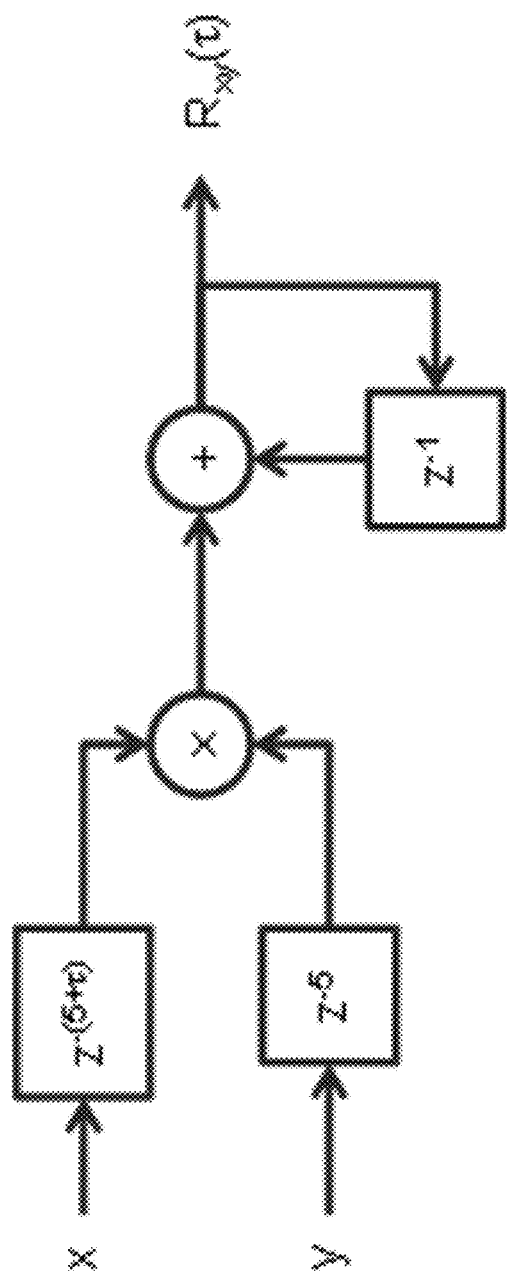
FIG. 27 is a graph that illustrates correlation values at various lags.

Implementation details about an exemplary serial correlator that may be included in a combined radar and telemetry system are now set forth. A serial correlator was used to de-spread each received pulse. The output of the serial correlator was actually a waveform. As designed, the block provides the correlation function over ±5 lags, where each lag corresponds to a sample of delay between the received signal and the reference phase code. The correlation value at each lag, r, was calculated as shown in FIG. 27. A bank of the sum blocks was used to calculate the correlation function Rxy(τ) over the desired lags. The peak of this function would correspond to the optimal alignment of the phase code with the received signal. With the high-bandwidth phase code, however, the time over which the phase code is aligned is on the order of a chip duration. For this design, it means that the return signal was aligned for at most 10 ns worth of path delay.

Figure 28:
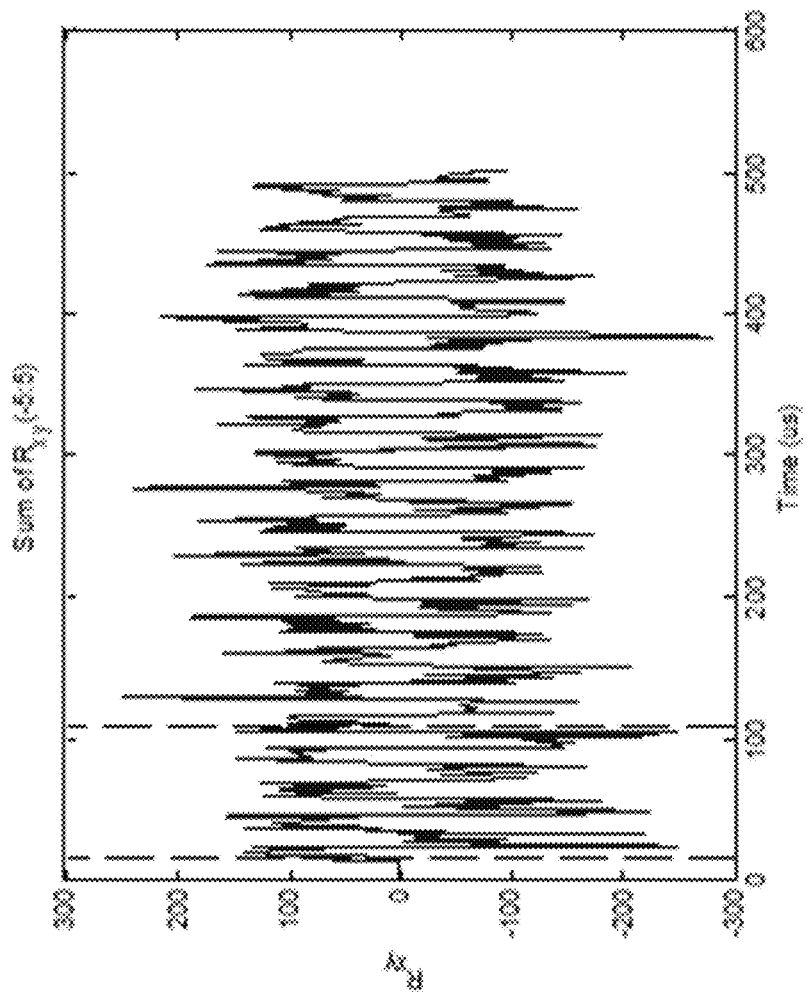
FIG. 28 illustrates summed correlator output with 43 kHz Doppler shift.

FIG. 28 shows the summed correlator output with 43 kHz Doppler shift. The dashed black lines mark the boundaries corresponding to one phase code.

SYSTEM GENERATOR was used to implement the serial correlator block. This block ran at the input sample rate of 400 MHz. Subsequent blocks in the receiver ran at 1 MHz or less. This was the most processor intensive portion of the receiver.

In order to use prebuilt arithmetic blocks available in SYSTEM GENERATOR, the combined radar and telemetry system was configured to support signed arithmetic. The noise output of each filter banks integrator block was analyzed to derive the triggering thresholds.

DSP operations were performed using fixed point arithmetic. Certain values were set manually, while others were allowed to be automatically propagated by SYSTEM GENERATOR.

Resource utilization of the design was relatively modest, as shown in Table 2. Each portion of the design used less than 5% of the available general logic resources.

TABLE 2

|  | Transmitter | Receiver |
| --- | --- | --- |
| Xilinx Device Family | Virtex 6 | Kintex 7 |
| Logic Slices | 5,881/150,720 (3%) | 7,384/203,800 (3%) |
| Registers | 8,284/301,440 (2%) | 8,200/407,600 (2%) |
| Dedicated Multipliers | 157/768 (20%) | 14/840 (1%) |
| Maximum Clock Speed | 450 MHz (.278 ns slack) | 400 MHz (.002 ns slack) |

The transmitter used a large number of dedicated multipliers in order to implement the FIR interpolation filters. No effort was taken to optimize this portion of the design and significant resource savings are likely available. Both the transmitter and receiver were designed to operate with a base 400 MHz clock. On a final compile of the prototype design, the XILINX tools reported that the transmitter timing included 0.278 ns of slack, corresponding to a maximum clock rate of 450 MHz. The receiver, on the other hand, just made timing with only 0.002 ns of slack. During development, 400 MHz was close to the top speed that was generally achievable in both designs without any extra effort in manual optimization of the compile.

This type of direct digital architecture could be implemented at a slower clock rate by additional parallelization, at the cost of additional hardware resources. Interfaces to the high-speed ADC and DAC are still required to run at the high clock rates (400 MHz for selected sampling frequencies), but many FPGAs have dedicated serializer/deserializer buffers to handle DDR transfers.

Figure 29:
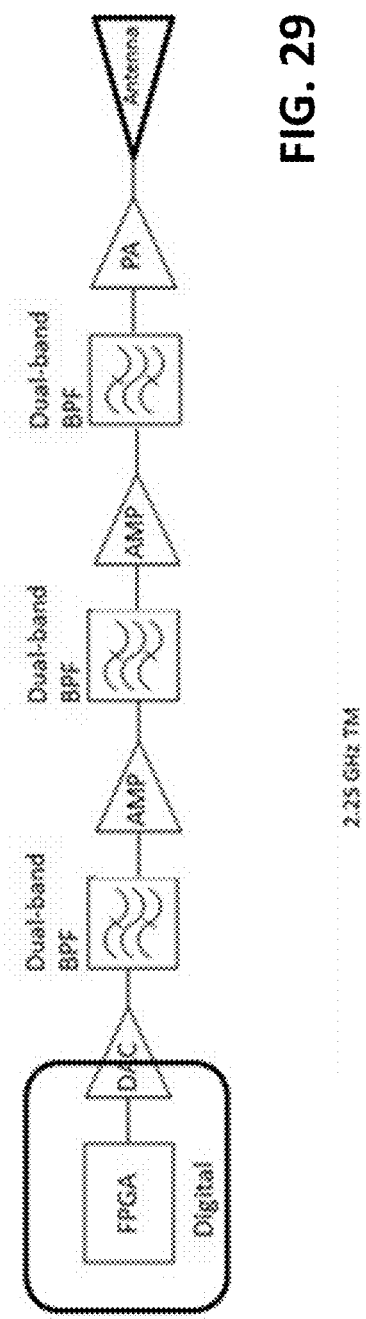
FIG. 29 depicts a block diagram of a transmitter.
Figure 30:
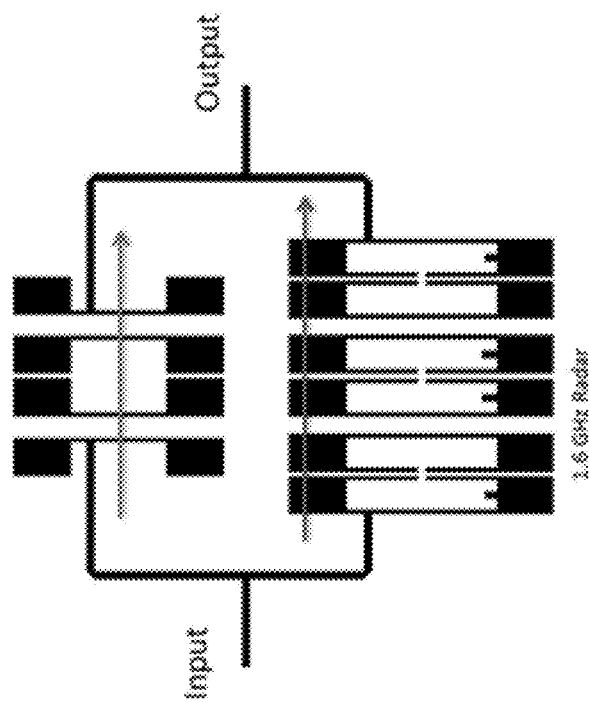
FIG. 30 illustrates an exemplary layout of a dual-band filter.
Figure 31:
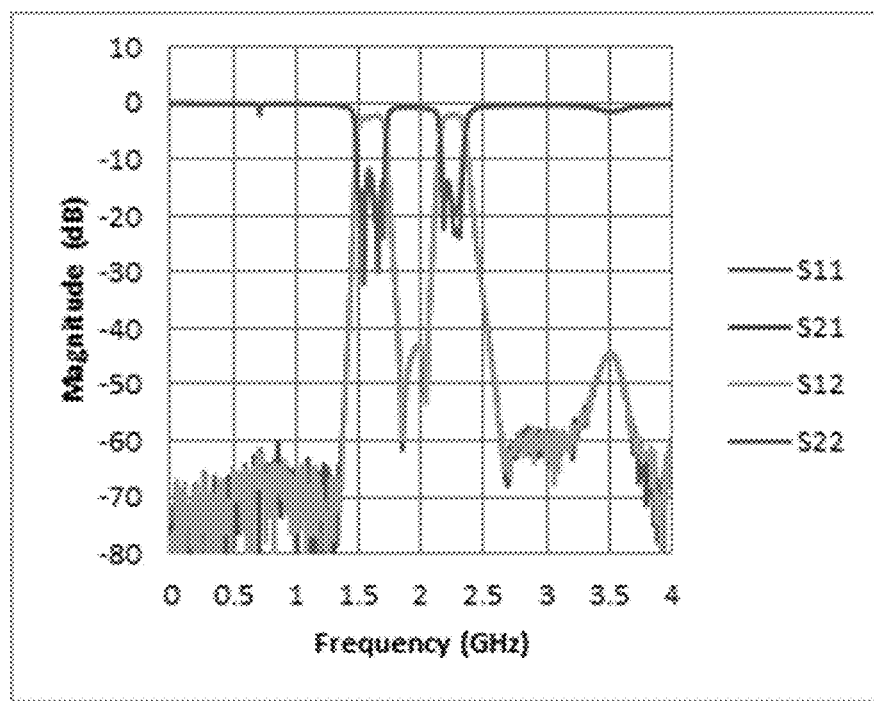
FIG. 31 illustrates an exemplary frequency response.
Figure 32:
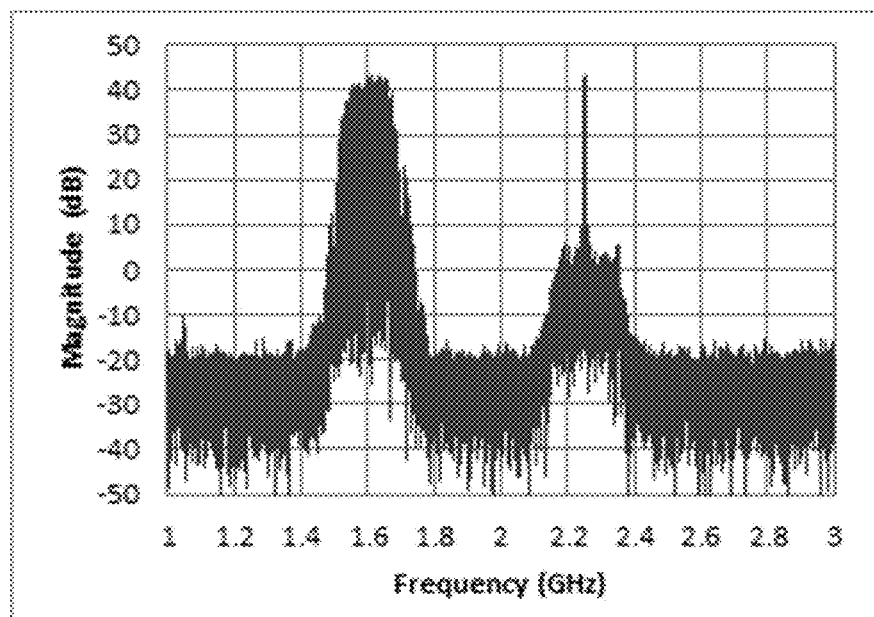
FIG. 32 depicts amplified output signals.

Details about the RF components used in the design are now set forth. Because the transmitted signal was generated digitally and sampled directly, the RF processing was relatively straightforward. Custom filters were used to remove spurious signals created as part of the digital synthesis. A block diagram of the transmitter is shown in FIG. 29. The output spectrum of the DAC included the radar signal centered at 1.6 GHz, the telemetry signal centered at 2.25 GHz, and inter-modulation signals (due to the DAC sampling frequency inter-modulating the baseband signals). Custom dual-band bandpass filters were designed to suppress unwanted signals. An exemplary layout of a dual-band filter used in the design is shown in FIG. 30. The filter shown in FIG. 30 was fabricated on a 0.64 mm thick RT/DUROID 6010.2 substrate with a relative dielectric constant $\in_r=10.2$. The size of the filter was 39.7 mm×36.9 mm. The frequency response of the filter is shown in FIG. 31. The insertion loss of radar was better than 2.3 dB and the insertion loss of telemetry was better than 2 dB. The 3 dB bandwidth of both radar and telemetry was 200 MHz. The rejection was is greater than 40 dB. Final amplified output signals are shown in FIG. 32. The peak power of radar and telemetry was 20 W.

Figure 33:
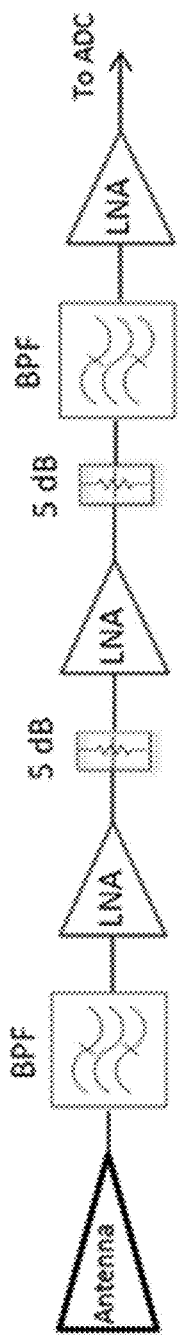
FIG. 33 illustrates an exemplary bock diagram of a receiver configuration.
Figure 34:
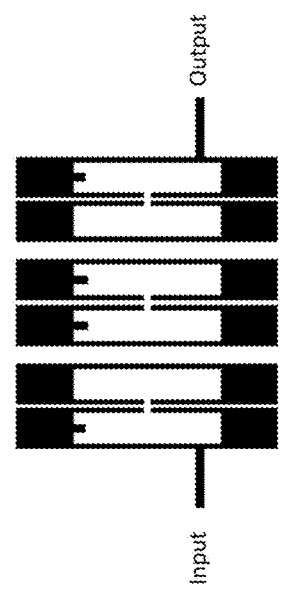
FIG. 34 illustrates an exemplary bandpass filter structure in the receiver.

A block diagram of the receiver configuration of the design is shown in FIG. 33. The noise filter of the receiver front end was 5.8 dB. The receiver gain was 61.8 dB. The receiver bandpass filter structure is shown in FIG. 34. The insertion loss of the filter was better than 2 dB and the 3 dB bandwidth was 200 MHz. The rejection was greater than 40 dB.

Figure 35:
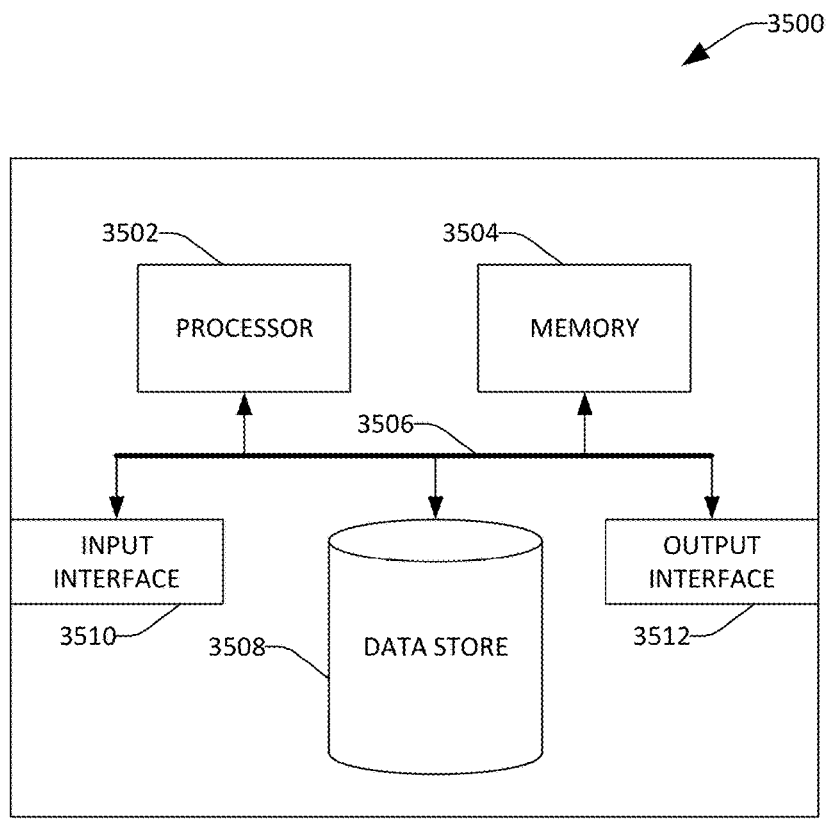
FIG. 35 illustrates an exemplary computing system.

Referring now to FIG. 35, a high-level illustration of an exemplary computing device 3500 that can be used in accordance with the systems and methodologies disclosed herein is illustrated. For instance, the computing device 3500 may be used in a system that supports simultaneously transmitting radar and telemetry signals. By way of another example, the computing device 3500 can be used in a system that supports encoding telemetry data into radar signals. The computing device 3500 includes at least one processor 3502 that executes instructions that are stored in a memory 3504. The instructions may be, for instance, instructions for implementing functionality described as being carried out by one or more components discussed above or instructions for implementing one or more of the methods described above. The processor 3502 may access the memory 3504 by way of a system bus 3506. In addition to storing executable instructions, the memory 3504 may also store telemetry data, radar waveforms, pseudo-random sequences, etc.

The computing device 3500 additionally includes a data store 3508 that is accessible by the processor 3502 by way of the system bus 3506. The data store 3508 may include executable instructions, radar waveforms, telemetry waveforms, modulation sequences, etc. The computing device 3500 also includes an input interface 3510 that allows external devices to communicate with the computing device 3500. For instance, the input interface 3510 may be used to receive instructions from an external computer device, from a user, etc. The computing device 3500 also includes an output interface 3512 that interfaces the computing device 3500 with one or more external devices. For example, the computing device 3500 may display text, images, etc. by way of the output interface 3512.

It is contemplated that the external devices that communicate with the computing device 3500 via the input interface 3510 and the output interface 3512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 3500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 3500 may be a distributed system. Thus, for instance, several devices may be in communication by way of a network connection and may collectively perform tasks described as being performed by the computing device 3500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A combined radar and telemetry system comprising:
a processing unit;
computer-readable non-transitory memory that stores instructions that, when executed by the processing unit cause the processing unit to output a digital baseband signal, the digital baseband signal based upon:
a radar waveform defined in the instructions; and
a telemetry waveform defined in the instructions; and
a radar and telemetry circuit that is configured to simultaneously transmit a radar signal and a telemetry signal based upon the digital baseband signal output by the processing unit.

2. The combined radar and telemetry system of claim 1, a field programmable gate array (FPGA) comprises the processing unit and the computer-readable non-transitory memory.

3. The combined radar and telemetry system of claim 1, the radar and telemetry circuit further configured to receive at least a portion of the radar signal that has been reflected from a target and output a digital return signal to the processing unit based upon the at least the portion of the radar signal.

4. The combined radar and telemetry system of claim 1, the instructions, when executed by the processing unit, are configured to further cause the processing unit to generate a digital cancellation signal that is configured to at least one of:
facilitate simultaneous cancellation of multiple leakage paths between a radar transmitter and a radar receiver; or
facilitate cancellation of clutter, a jammer, a blocker, or an interferer.

5. The combined radar and telemetry system of claim 1, the radar and telemetry circuit comprises a digital to analog converter (DAC) that is configured to receive the digital baseband signal and convert the digital baseband signal to an analog baseband signal.

6. The combined radar and telemetry system of claim 5, the DAC configured to process data at a rate of at least 1600 megasamples per second with at least 14 bit resolution.

7. The combined radar and telemetry system of claim 5, the radar and telemetry circuit further comprises a sideband modulator that is operably coupled to the DAC, the sideband modulator configured to amplitude modulate the analog baseband signal and output a modulated signal.

8. The combined radar and telemetry system of claim 1, the processing unit configured with a polyphase architecture to synchronize the radar waveform and the telemetry waveform to generate the baseband signal.

9. The combined radar and telemetry system of claim 1, the processing unit being reprogrammable with updated instructions, wherein the updated instructions update at least one of the radar waveform or the telemetry waveform.

10. The combined radar and telemetry system of claim 1, further comprising one of a motor vehicle, an airplane, or a drone.

11. A method comprising:
at a processing unit, generating a digital baseband signal based upon a radar waveform and a telemetry waveform, wherein the radar waveform and telemetry waveform are defined in instructions executed by the processing unit;
converting the digital baseband signal to an analog baseband signal; and
simultaneously transmitting a radar signal and a telemetry signal from an antenna based upon the analog baseband signal.

12. The method of claim 11, the radar waveform has a first center frequency and the telemetry waveform has a second center frequency, the first center frequency being different from the second center frequency.

13. The method of claim 11, further comprising:
at the processing unit, receiving a digital signal that is based upon a reflected radar signal; and
outputting data based upon the digital signal, the data being indicative of at least one of:
a distance between the antenna and a target;
a velocity of the antenna relative to the target; or
existence of an object in a scene.

14. The method of claim 13, further comprising outputting navigation instructions based upon the data, wherein a motor vehicle operates based upon the navigation instructions.

15. The method of claim 11, further comprising:
at the processing unit, outputting a digital cancellation signal, the digital cancellation signal configured to cancel at least one leakage path between a receiver and a transmitter of a radar platform;
converting the digital cancellation signal to an analog cancellation signal; and
transmitting the analog cancellation signal to an analog to digital converter (ADC).

16. The method of claim 15, the digital cancellation signal configured to simultaneously cancel multiple leakage paths between the receiver and the transmitter of the radar platform.

17. A combined radar and telemetry system, comprising:
at least one processor;
memory storing instructions that, when executed by the at least one processor, cause the at least one processor to perform acts comprising:
constructing a digital baseband signal, the digital baseband signal based upon a defined radar waveform and a telemetry waveform defined in the instructions executed by the at least one processor; and
an antenna that simultaneously transmits a radar signal and a telemetry signal based upon the digital baseband signal.

18. The combined radar and telemetry system of claim 17, further comprising a digital to analog converter (DAC) coupled to the antenna, the DAC converts the digital baseband signal to an analog baseband signal, wherein the radar signal and the telemetry signal are based upon the analog baseband signal.

19. The combined radar and telemetry system of claim 17, the radar waveform has a first center frequency, the telemetry waveform has a second center frequency, the first center frequency being different from the second center frequency.

20. The combined radar and telemetry system of claim 17, further comprising a second antenna that receives a reflected radar signal, the reflected radar signal based upon the radar signal.

* * * * *